United States Patent
Chaturvedi et al.

(10) Patent No.: US 11,030,861 B2
(45) Date of Patent: Jun. 8, 2021

(54) METHOD AND SYSTEM FOR PROCESSING CASH-WITHDRAWAL TRANSACTIONS

(71) Applicant: MASTERCARD INTERNATIONAL INCORPORATED, Purchase, NY (US)

(72) Inventors: Abhishek Chaturvedi, Lucknow (IN); Lakshmi Narasimhan Ramanujam, Chennai (IN); Parameswaran Venkatasubramanian, Chennai (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/720,953

(22) Filed: Dec. 19, 2019

(65) Prior Publication Data
US 2020/0242898 A1     Jul. 30, 2020

(30) Foreign Application Priority Data
Jan. 28, 2019   (SG) ............................ 10201900787T

(51) Int. Cl.
| | | |
|---|---|---|
| *G06Q 40/00* | (2012.01) | |
| *G07F 19/00* | (2006.01) | |
| *G06Q 30/02* | (2012.01) | |
| *G06Q 20/36* | (2012.01) | |

(52) U.S. Cl.
CPC ....... *G07F 19/203* (2013.01); *G06Q 20/3672* (2013.01); *G06Q 30/0237* (2013.01)

(58) Field of Classification Search
CPC ............... G06Q 20/1085; G06Q 20/36; G06Q 20/3672; G06Q 30/0237; G07F 19/203
See application file for complete search history.

(56) References Cited

U.S. PATENT DOCUMENTS

| | | | | |
|---|---|---|---|---|
| 2010/0017302 A1* | 1/2010 | Scipioni | ................. | G06Q 40/12 705/26.1 |
| 2010/0078472 A1* | 4/2010 | Lin | ......................... | G06Q 40/02 235/379 |
| 2011/0010253 A1* | 1/2011 | Chenot | ................ | G06Q 20/347 705/17 |
| 2012/0066077 A1* | 3/2012 | Kingston | ............. | G06Q 20/425 705/16 |
| 2012/0310774 A1* | 12/2012 | Chassin | ............... | G06Q 20/227 705/26.41 |

(Continued)

*Primary Examiner* — Thien M Le
(74) *Attorney, Agent, or Firm* — Budzyn IP Law, LLC

(57) ABSTRACT

A method for processing cash-withdrawal transactions is provided. When available cash at a terminal device is less than a first amount that a user wants to withdraw, the terminal device presents a first option to the user to receive a first part of the first amount, which the terminal device is falling short of, as a voucher or a credit in a digital wallet. When the first option is selected, the terminal device displays a list of digital wallets and vouchers to the user. The terminal device communicates a first request to the payment network indicating a selection of the first option and one of a voucher or a digital wallet. Based on the first request, the payment network initiates crediting of the first part in the digital wallet or procuring of the voucher, with the terminal device dispensing the remaining part of the first amount as cash.

15 Claims, 20 Drawing Sheets

(56) References Cited

U.S. PATENT DOCUMENTS

2015/0242949 A1* 8/2015 Phillips, IV ........... G06Q 40/04
 705/37
2016/0247233 A1* 8/2016 Page .................... G06Q 20/405
2019/0139033 A1* 5/2019 Ricotta .............. G06Q 20/3678

* cited by examiner

METHOD AND SYSTEM FOR PROCESSING CASH-WITHDRAWAL TRANSACTIONS

FIELD OF THE INVENTION

The present invention relates to the field of electronic transactions, and, more particularly to a method and a system for processing cash-withdrawal transactions.

BACKGROUND

With the advancement in technology, users prefer withdrawing cash as and when required at terminal devices (such as automatic teller machines, ATMs). The users may use their transaction cards, such as debit cards, credit cards, prepaid cards, gift cards, or promotional cards to withdraw cash at the terminal devices. In one scenario, the terminal devices also allow the users to perform card-less transactions as well for withdrawing cash.

Generally, when a user initiates a cash-withdrawal transaction at a terminal device for withdrawing cash, details of the cash-withdrawal transaction are routed to an issuer that corresponds to the cash-withdrawal transaction. The issuer may approve or decline the cash-withdrawal transaction. In various scenarios, in spite of an approval from the issuer, the cash-withdrawal transaction may be declined. One such scenario is where the terminal device is unable to dispense cash requested by the user due to insufficient cash reserve or an internal fault. Such a declined cash-withdrawal transaction causes great inconvenience to the user and also fail to provide any monetary benefits to financial institutions, such as the issuer, a payment network, and an acquirer, involved in the processing of the cash-withdrawal transaction. In some scenarios, the terminal device may fall short of a very small amount of cash but still the cash-withdrawal transaction is declined.

In light of foregoing, there exists a need for a solution that prevents a cash-withdrawal transaction from getting declined due to insufficient cash reserve at a terminal device or inability of the terminal device to dispense cash.

SUMMARY

In an embodiment of the present invention, a method for processing cash-withdrawal transactions is provided. A first request is received by a server from a terminal device, such that the first request indicates a selection of at least one option by a user. The at least one option is presented on the terminal device when a cash-withdrawal transaction is requested by the user at the terminal device for withdrawing a first amount of cash and when a second amount of cash available at the terminal device is less than the first amount. The selection of the at least one option indicates that consent is provided by the user to receive at least a first part of the first amount as one of a first voucher or a credit in a first digital wallet. Based on the first request, the server either initiates crediting of the first part of the first amount in the first digital wallet or procuring of the first voucher for the user.

In another embodiment of the present invention, a system for processing cash-withdrawal transactions is provided. The system includes a payment network server that is configured to receive from a terminal device, a first request indicating a selection of at least one option by a user. The at least one option is presented on the terminal device when a cash-withdrawal transaction is requested by the user at the terminal device for withdrawing a first amount of cash and when a second amount of cash available at the terminal device is less than the first amount. The selection of the at least one option indicates that consent is provided by the user to receive at least a first part of the first amount as one of a first voucher or a credit in a first digital wallet. The server initiates either procuring of the first voucher for the user or crediting of the first part of the first amount in the first digital wallet, based on the first request.

In yet another embodiment of the present invention, a method for processing cash-withdrawal transactions is provided. A cash-withdrawal transaction request is generated by a terminal device when a cash-withdrawal transaction is requested by a user at the terminal device for withdrawing a first amount of cash. At least one option is presented to the user by the terminal device for receiving at least a first part of the first amount as one of a first voucher or a credit in a first digital wallet, when a second amount of cash available at the terminal device is less than the first amount. A first request indicating a selection of the first option by the user is communicated to a server by the terminal device. Based on the first request, the server initiates procuring of the first voucher for the user or crediting of the first part of the first amount in the first digital wallet.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements.

Figure 1:
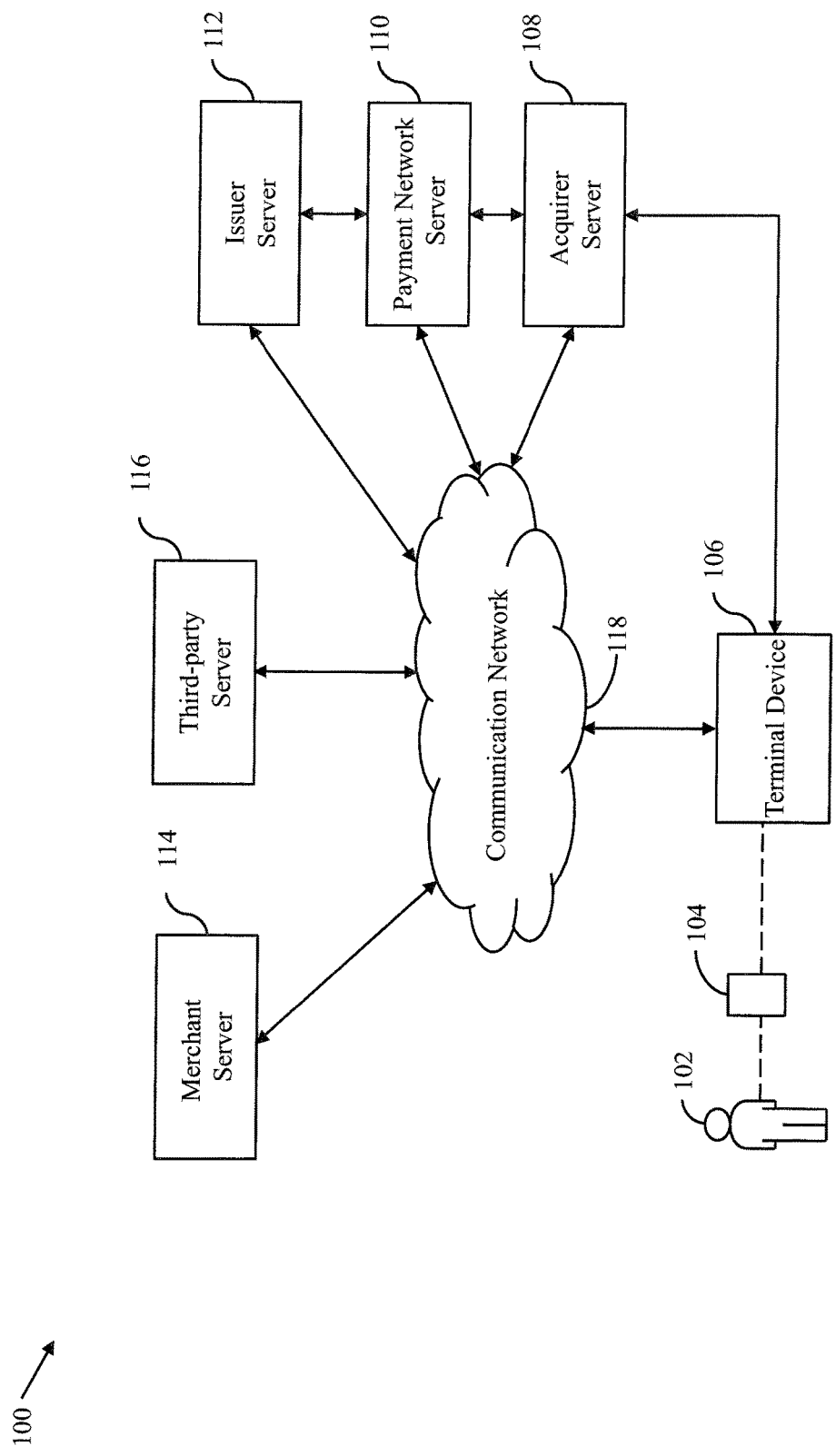
FIG. 1 is a block diagram that illustrates an environment for processing cash-withdrawal transactions, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Generally, when a user performs a cash-withdrawal transaction at a terminal device and the terminal device does not have enough cash available, the cash-withdrawal transaction is denied. Such declined cash-withdrawal transactions cause great inconvenience to users and are of no benefit to financial institutions, such as acquirers, issuers, and payment networks, processing the cash-withdrawal transactions.

Various embodiments of the present invention provide a method and a system that solve the abovementioned problems by preventing a cash-withdrawal transaction from getting declined due to insufficient cash reserve at a terminal device, for example an automated teller machine (ATM). When a user performs a cash-withdrawal transaction at the terminal device to withdraw a first amount of cash, the terminal device checks whether a second amount of cash available at the terminal device is greater than or equal to the first amount. When the second amount is less than the first amount, the terminal device displays a first option to the user. The first option, when selected, allows the user to receive a first part of the first amount as digital money, for example, as a voucher or a credit in a digital wallet. When the user selects the first option, the terminal device displays a list of digital wallets and vouchers to the user for selection. The user may select any one of the digital wallets or the vouchers from the displayed list. For example, the user may select a first digital wallet from the list of digital wallets and vouchers. The terminal device communicates a first request to the payment network indicating a selection of the first option and the first digital wallet. Based on the first request, the payment network determines a value of the first part and a value of a second part of the first amount. The second part is a difference between the first amount and the first part. The payment network then identifies an entity (for example, the issuer, the acquirer, the payment network, or a third-party digital wallet provider) that maintains the first digital wallet and communicates a credit request to the entity for crediting the first part to the first digital wallet. The payment network further communicates a cash-dispense request to the terminal device, based on which the terminal device dispenses cash equivalent to the second value. In another embodiment, the user may select a first voucher from the list of digital wallets and vouchers. In this scenario, the payment network communicates a voucher procurement request to a merchant for procuring the first voucher. The first voucher is then provided to the user.

Thus, the method and system of the present invention prevents the cash-withdrawal transaction from getting declined even when the terminal device has insufficient cash. Hence, a count of successful transactions increases which increases profit margins of the financial institutions involved in transaction processing.

Terms Description (in Addition to Plain and Dictionary Meaning)

Account is a payment account that is used to fund transactions. Examples of the account include, but are not limited to, a savings account, a credit account, and/or a checking account. The account is associated with an entity, such as an individual person, a family, a commercial entity, a company, a corporation, a governmental entity, a non-profit organization, or the like. In this scenario, the entity corresponds to an account holder of the account.

Transaction card is a payment means, such as a debit card, a credit card, a prepaid card, a gift card, a promotional card, a contactless card, an electronic cash card, and/or like, that is linked to an account and holds identification information of the account. The transaction card can be used to perform transactions, such as deposits and cash-withdrawals, credit transfers, purchase payments, and the like, from the account to which it is linked. The transaction card can be a physical card or a virtual card that is electronically stored in a user device. The transaction card may be radio frequency identification (RFID) or near field communication (NFC) enabled for performing contactless transactions.

Terminal device is a computing device affiliated with a financial institution, such as a bank (hereinafter "acquirer"). The terminal device enables users to perform various electronic transactions, such as cash withdrawals, cash deposits, or the like. Examples of the terminal device include, but are not limited to, an ATM, a bunch note acceptor (BNA), a currency recycler, or the like.

Merchant is an entity that offers various products and/or services in exchange of payments. The merchant may establish a merchant account with a financial institution, such as an acquirer to accept the payments from several users by use of one or more payment means. The merchant offers various promotions and discounts in the form of vouchers.

Issuer is a financial institution where accounts of several users are established and maintained. The issuer ensures payment for authorized transactions in accordance with various payment network regulations and local legislation.

Payment networks, such as those operated by Mastercard®, process transactions between acquirers and issuers. Processing by a payment network includes steps of authorization, clearing, and settlement.

Server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of a payment network server, an issuer server, an acquirer server, a merchant server, or a third-party server.

Cash-withdrawal transaction request is an authorization request that is pursuant to one or more standards for the interchange of transaction messages, such as the ISO8583 standard. The cash-withdrawal transaction request is generated to validate and authorize a cash-withdrawal transaction performed by a user. Based on the cash-withdrawal transaction request, an issuer, corresponding to the cash-withdrawal transaction, approves or declines the cash-withdrawal transaction. The cash-withdrawal transaction request includes various data elements (DEs) indicating details of the cash-withdrawal transaction, such as an amount requested by the user who performed the cash-withdrawal transaction, details of an account, details of a merchant account, a timestamp of the cash-withdrawal transaction, a transaction identifier (ID) of the cash-withdrawal transaction, or the like.

Authorization response is a response generated by an issuer for a cash-withdrawal transaction request corresponding to a cash-withdrawal transaction. The issuer generates the authorization response to indicate whether the cash-withdrawal transaction is authorized. The authorization response is pursuant to one or more standards for the interchange of transaction messages, such as the ISO8583 standard, and includes various data fields, such as DEs, for storing transaction details of the cash-withdrawal transaction.

First amount is an amount of cash that a user wants to withdraw at a terminal device. For example, the first amount is equal to $2,000, when a cash-withdrawal transaction is performed by the user at the terminal device to withdraw $2,000.

A second amount is an amount of cash that is available at a terminal device at any given point of time. For example, the second amount is equal to $1,200, when the terminal device has $1,200 as cash reserve. In another example, the second amount is equal to $0, when there is no cash available at the terminal device.

A first part of a first amount is an amount that a terminal device is falling short of when a user performs a cash-withdrawal transaction at the terminal device and is to be provided to the user as one of a voucher or credit in a digital wallet. Thus, the first part is a difference between a first amount, which the user wants to withdraw, and a second amount, which is available as cash at the terminal device. For example, when the user wants to withdraw $2,000 at the terminal device and the terminal device has $1,200 as cash reserve, the first part is equal to $800. In another example, when the user wants to withdraw $2,000 at the terminal device and the terminal device does not have any cash, the first part is equal to $2,000 (i.e., the first amount). A difference of the first amount and the first part is dispensed as cash at the terminal device and referred to as a second part of the first amount. For example, when the first amount is $2,000 and the first part is $800, the second part of the first amount is equal to $1,200. In another example, when the first amount is $2,000 and the first part is $2,000, the second part of the first amount is equal to $0 and no cash is dispensed at the terminal device.

Voucher is a certificate that is provided to a user and has a certain monetary value. The user is entitled to a discount or a special offer worth the monetary value upon the use of the voucher. For example, a user gets a discount of USD 100 while purchasing a product worth USD 500, when she redeems a voucher that offers 20% discount upon a purchase of USD 400 or more. Examples of the voucher include, but are not limited to, a gift card, a discount coupon, a promotional offer, a token, or offer codes. In one embodiment, the voucher is a physical entity, such as a printed paper. In another embodiment, the voucher is a virtual entity that is electronically stored in a memory of a computing device of the user.

Digital wallet is a payment means which is used for performing electronic transactions. Digital wallet may be linked to a user account or a transaction card of a user and stores digital money. Examples of digital wallets include, but are not limited to, Amazon Pay® wallet, PayPal®, or Google Wallet®.

DESCRIPTION OF THE EMBODIMENTS

FIG. 1 is a block diagram that illustrates an exemplary environment 100 for processing cash-withdrawal transactions, in accordance with an embodiment of the present invention. The environment 100 includes a user 102 in possession of a transaction card 104. The environment 100 further includes a terminal device 106, an acquirer server 108, a payment network server 110, an issuer server 112, a merchant server 114, and a third-party server 116. The terminal device 106, the acquirer server 108, the payment network server 110, the issuer server 112, the merchant server 114, and the third-party server 116 communicate with each other by way of a communication network 118 or through separate communication networks established therebetween.

The user 102 is an individual, who is an account holder of a user account maintained by a financial institution, such as an issuer. The issuer may have issued the transaction card 104 to the user 102 for performing transactions from the user account. The transaction card 104 is linked to the user account and stores identification information of the user account (hereinafter, referred to as "account information" of the user account) in the form of an electronic chip or a machine-readable magnetic strip. The account information may include an account number, a name of an account holder (i.e., the user 102), or the like. The transaction card 104 further has a unique card number, an expiry date, a card security code, and a card type associated with it. The unique card number, the expiry date, the card security code, and the card type are collectively referred to as card details of the transaction card 104. In one embodiment, the transaction card 104 is a physical card used for performing the transactions at the terminal device 106. In another embodiment, the transaction card 104 is a virtual card stored in a memory of a user device (not shown) of the user 102. Examples of the transaction card 104 include a credit card, a debit card, a membership card, a promotional card, a charge card, a prepaid card, a gift card, an electronic cash card, or the like. In one embodiment, the user 102 may be an account holder of one or more digital wallets. The digital wallets are payment means that allow the user 102 to perform electronic transactions.

The terminal device 106 includes suitable logic, circuitry, interfaces, and/or codes, executed by the circuitry, that are configured to allow users (such as the user 102) to perform transactions (such as cash deposit, cash-withdrawal, and/or balance enquiry) from corresponding user accounts. The terminal device 106 may be associated with a financial institution, such as an acquirer. Examples of the terminal device 106 include an ATM, a BNA, a currency recycler, or the like. The terminal device 106 is capable of reading card details of the transaction card 104 when the user 102 uses the transaction card 104 at the terminal device 106. The terminal device 106 further allows the user 102 to perform card-less transactions, as known by those skilled in the art. When the user 102 performs a cash-withdrawal transaction at the terminal device 106 to withdraw a first amount of cash, the terminal device 106 generates a cash-withdrawal transaction request and communicates it to the acquirer server 108. The cash-withdrawal transaction request includes various data elements that represent transaction details of the cash-withdrawal transaction and are pursuant to one or more standards for the interchange of transaction messages, such as the ISO8583 standard. The transaction details may include card details, account information, a transaction amount, a timestamp of the transaction, a transaction identifier (ID) of the transaction, or the like.

In one scenario, the terminal device 106 may have insufficient cash reserve therein to cover the first amount. In such a scenario, the terminal device 106 presents a first option to the user 102 to receive a first part of the first amount (i.e., the transaction amount), which the terminal device 106 is falling short of, as a voucher or credit in a digital wallet and a second part of the first amount as cash at the terminal device 106. If the user 102 selects the first option, the terminal device 106 presents a list of digital wallets and vouchers to the user 102 for selection. When the user 102 selects a digital wallet from the list of digital wallets and vouchers, an amount equivalent to the first part is credited to the selected digital wallet. When the user 102 selects a voucher from the list of digital wallets and vouchers, the user 102 receives the voucher for an amount equivalent to the first part. In one scenario, the terminal device 106 may have a second amount available with it as cash reserve such that the second amount is less than the first amount. In such a case, the first part of the first amount is a difference between the first amount and the second amount, and the terminal device 106 dispenses the second amount (i.e., the second part) as cash. In another scenario, the terminal device 106 may not have any cash reserve, thus the first part of the first amount is equal to the first amount and the terminal device 106 does not dispense any cash.

The acquirer server 108 is a computing server that is operated by the acquirer and includes suitable logic, circuitry, interfaces, and/or codes, executed by the circuitry, that are configured to process transactions. The acquirer server 108 receives the cash-withdrawal transaction request from the terminal device 106 and transmits the cash-withdrawal transaction request to a corresponding issuer, by way of the payment network server 110, for authorizing the cash-withdrawal transaction. The acquirer server 108 further receives an authorization response from the issuer in response to the cash-withdrawal transaction request. In one embodiment, when an authorization response indicates that the cash-withdrawal transaction initiated at the terminal device 106 is approved by the corresponding issuer, the acquirer server 108 instructs the terminal device 106 to dispense cash equivalent to the first amount. In one scenario, when the second amount available at the terminal device 106 is less than the first amount, the acquirer server 108 may instruct the terminal device 106 to dispense available cash instead of the transaction amount. The acquirer server 108 further offers a digital wallet service and maintains digital wallets of various users who have availed the offered digital wallet service. In one embodiment, when the user 102 selects a digital wallet maintained at the acquirer server 108 to receive the first part of the first amount as credit, the acquirer server 108 credits the first part in the selected digital wallet.

The payment network server 110 is a computing server that is operated by a payment network and includes suitable logic, circuitry, interfaces, and/or codes, executed by the circuitry, that are configured to process transactions. The payment network server 110 represents an intermediate entity between the acquirer server 108 and the issuer server 112 for authorizing and funding the transactions (such as cash-withdrawal transactions) performed at the terminal device 106. The payment network server 110 receives the cash-withdrawal transaction request from the acquirer server 108 and routes the cash-withdrawal transaction request to the corresponding issuer server (such as the issuer server 112) for processing. In one embodiment, when the first option is selected by the user 102, the payment network server 110 determines a value of the first part of the first amount and facilitates crediting of the digital wallet or procuring of the voucher. The payment network server 110 further determines a value of a second part of the first amount that is to be dispensed as cash at the terminal device 106. The payment network server 110 further offers a digital wallet service and maintains digital wallets of various users who have availed the offered digital wallet service. In one embodiment, when the user 102 selects a digital wallet maintained at the payment network server 110 to receive the first part of the first amount as credit, the payment network server 110 credits the first part of the first amount in the selected digital wallet. Examples of various payment networks include Mastercard, Discover®, Diners Club®, or the like.

The issuer server 112 is a computing server that is operated by the issuer and includes suitable logic, circuitry, interfaces, and/or codes, executed by the circuitry, that are configured to process transactions. The issuer is a financial institution that manages user accounts of multiple users. Account details of the user accounts, such as the user account of the user 102, established with the issuer are stored as account profiles in a memory (not shown) of the issuer server 112 or on a cloud server associated with the issuer server 112. The account details may include an account balance, an available credit line, details of an account holder, transaction history of the account holder, account information, or the like. The details of the account holder may include name, age, gender, physical attributes, registered contact number, alternate contact number, registered e-mail ID, or the like of the account holder. The issuer server 112 receives the cash-withdrawal transaction request from the payment network server 110 and authorizes the cash-withdrawal transaction. The issuer server 112 further offers a digital wallet service and maintains digital wallets of various users who have availed the offered digital wallet service. In one embodiment, when the user 102 selects a digital wallet maintained at the issuer server 112 to receive the first part of the first amount as credit, the issuer server 112 credits the first part of the first amount in the selected digital wallet. Methods for processing transactions via the issuer server 112 will be apparent to persons having skill in the art and may include processing a transaction via the traditional four-party system or the traditional three-party system.

The merchant server 114 is a computing server operated by a merchant and includes suitable logic, circuitry, interfaces, and/or codes, executed by the circuitry, that are configured to generate one or more vouchers. The merchant server 114 generates a voucher based on a request received from the payment network server 110. In one embodiment, the merchant server 114 may provide the voucher to the payment network server 110, which in turn may provide the procured voucher to the user 102. For example, the payment network server 110 communicates details of the voucher to the terminal device 106 and the terminal device 106 generates a receipt including the details of the voucher for providing the voucher to the user 102. In another scenario, the terminal device 106 may display the details of the voucher to the user 102. In another embodiment, the merchant server 114 may directly communicate the details of the voucher to the user 102. Examples of voucher include, but are not limited to, a shopping voucher, a salon voucher, a grocery voucher, a movie voucher, a restaurant voucher, or the like.

The third-party server 116 is a computing server operated by a third-party wallet provider and includes suitable logic, circuitry, interfaces, and/or codes, executed by the circuitry, that are configured to maintain digital wallets. The third-party server 116 may offer a digital wallet service and maintain the digital wallets of various users who have availed the offered digital wallet service. In one embodiment, when the user 102 selects a digital wallet maintained at the third-party server 116 to receive the first part of the first amount as credit, the third-party server 116 credits the first part in the selected digital wallet.

Examples of the acquirer server 108, the payment network server 110, the issuer server 112, the merchant server 114, and the third-party server 116 include, but are not limited to, computers, laptops, mini-computers, mainframe computers, any non-transient and tangible machines that can execute a machine-readable code, cloud-based servers, distributed server networks, a network of computer systems, or a combination thereof.

The communication network 118 is a medium through which content and messages are transmitted between the terminal device 106, the acquirer server 108, the payment network server 110, the issuer server 112, the merchant server 114, the third-party server 116, or other entities that are pursuant to one or more standards for the interchange of transaction messages, such as the ISO8583 standard. Examples of the communication network 118 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 118 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof.

Figure 2:
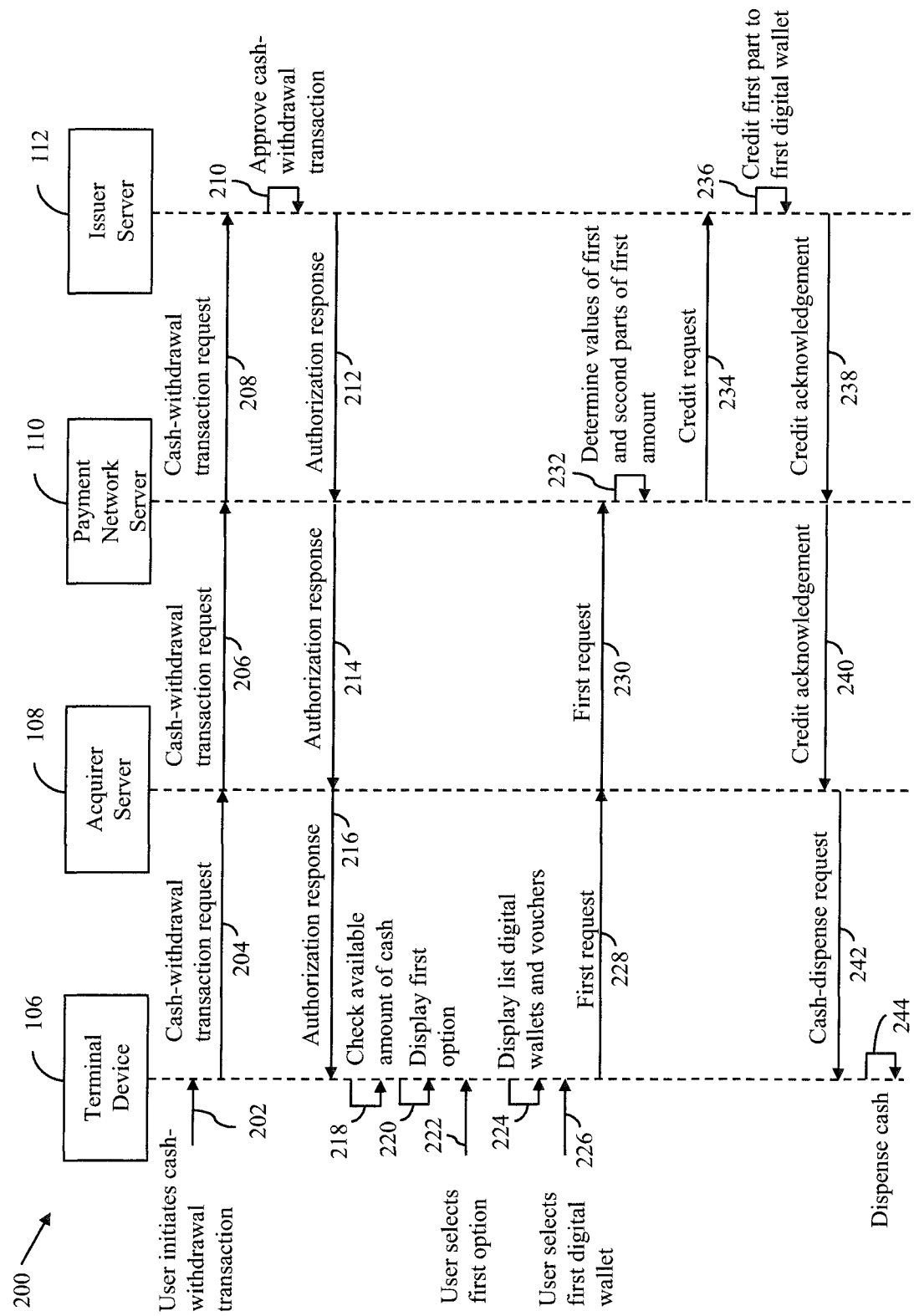
FIG. 2 is a process flow diagram that illustrates an exemplary scenario for processing cash-withdrawal transactions, in accordance with an embodiment of the present invention.

FIG. 2 is a process flow diagram 200 that illustrates an exemplary scenario for processing cash-withdrawal transactions, in accordance with an embodiment of the present invention. The process flow diagram 200 involves the terminal device 106, the acquirer server 108, the payment network server 110, and the issuer server 112.

A cash-withdrawal transaction is initiated by the user 102 at the terminal device 106 for withdrawing a first amount (i.e., the transaction amount, for example, $2,000) of cash (as shown by arrow 202). The cash-withdrawal transaction may be initiated by using various means (for example, the transaction card 104, cardless transaction, or the like) that are known to those skilled in the art. The terminal device 106 communicates a cash-withdrawal transaction request to the acquirer server 108 (as shown by arrow 204). The cash-withdrawal transaction request includes the transaction details (such as card details, account information, a transaction amount, a timestamp, a transaction ID, or the like) of the cash-withdrawal transaction. The acquirer server 108 identifies a payment network that corresponds to the cash-withdrawal transaction, as known by those skilled in the art. The acquirer server 108 communicates the cash-withdrawal transaction request to the payment network server 110 of the identified payment network (as shown by arrow 206). The payment network server 110 receives the cash-withdrawal transaction request and identifies the issuer that corresponds to the cash-withdrawal transaction, as known by those skilled in the art. Once the issuer is identified, the payment network server 110 communicates the cash-withdrawal transaction request to the issuer server 112 of the identified issuer (as shown by arrow 208). The issuer server 112 approves the cash-withdrawal transaction request (as shown by arrow 210) and communicates an authorization response to the payment network server 110 (as shown by arrow 212). The payment network server 110 communicates the authorization response to the acquirer server 108 (as shown by arrow 214) and the acquirer server 108 communicates the authorization response to the terminal device 106 (as shown by arrow 216). By way of the authorization response, the terminal device 106 is notified that the cash-withdrawal transaction has been approved by the issuer. The terminal device 106 then checks whether the available amount of cash (i.e., the second amount) is less than the first amount (as shown by arrow 218). In a non-limiting example, it is assumed that the second amount is equal to $1,200, which is less than the first amount (i.e., $2,000). When the first amount (i.e., $2,000) is determined to be greater than the second amount (i.e., $1,200), the terminal device 106 notifies the user 102 and displays a first option for selection (as shown by arrow 220). In a non-limiting example, it is assumed that first option is selected by the user 102 (as shown by arrow 222). The first option, when selected, allows the user 102 to receive a first part (i.e., $800) of the first amount, which the terminal device 106 is falling short of, as one of a voucher or credit in a digital wallet. When the first option is selected by the user 102, the terminal device 106 displays a list of digital wallets and vouchers to the user 102 for selection (as shown by arrow 224). In a non-limiting example, it is assumed that a first digital wallet that is maintained at the issuer server 112 is selected by the user 102 from the list of digital wallets and vouchers (as shown by arrow 226). The selection of the first option and the first digital wallet indicates that the user 102 has provided consent to receive the first part ($800) of the first amount as credit in the first digital wallet and a second part (i.e., $2,000−$800=$1,200) of the first amount as cash. The second part is same as the second amount. When the first digital wallet is selected by the user 102, the terminal device 106 may prompt the user 102 to provide a unique wallet identifier of the first digital wallet. The unique wallet identifier may be a wallet ID that uniquely identifies the first digital wallet, a mobile number linked to the first digital wallet, an email ID linked to the first digital wallet, or a combination thereof.

The terminal device 106 communicates to the acquirer server 108 a first request indicating the selection of the first option and the first digital wallet by the user 102 (as shown by arrow 228). The first request includes the unique wallet identifier provided by the user 102. The acquirer server 108 communicates the first request to the payment network server 110 (as shown by arrow 230). By way of the first request, the payment network server 110 is notified that the user 102 has agreed to receive the first part (i.e., $800) as credit in the first digital wallet. The payment network server 110 then determines the value of the first part and the value of the second part of the first amount (as shown by arrow 232). Since the first digital wallet is maintained at the issuer server 112, the payment network server 110 communicates a credit request to the issuer server 112 for crediting the first part (i.e., $800) of the first amount to the first digital wallet (as shown by arrow 234). The credit request includes the unique wallet identifier provided by the user 102 and the value of the first part. Based on the credit request, the issuer server 112 identifies the first digital wallet and credits the first part (i.e., $800) of the first amount to the first digital wallet (as shown by arrow 236). When the first digital wallet is successfully credited with the first part (i.e., $800), the issuer server 112 communicates a credit acknowledgement to the payment network server 110 (as shown by arrow 238) and the payment network server 110 communicates the credit acknowledgement to the acquirer server 108 (as shown by arrow 240). The acquirer server 108 communicates a cash-dispense request to the terminal device 106 for dispensing cash equivalent to the second part (i.e., $1,200) of the first amount (as shown by arrow 242). Based on the cash-dispense request, the terminal device 106 dispenses the second part (i.e., $1,200) of the first amount as cash (as shown by arrow 244). The issuer server 112 deducts the first amount (i.e., $2,000) from the user account of the user 102. In another exemplary scenario, the second amount may be equal to zero. In this case, the first part is same as the first amount. Thus, the first amount is credited to the first digital wallet and the terminal device 106 does not dispense any cash.

In another embodiment, the issuer server 112 may not approve the cash-withdrawal transaction due to insufficient balance in the user account. In such a scenario, the terminal device 106 does not present the first option to the user 102. In another embodiment, the user 102 may not select the first option presented on the terminal device 106, thus causing the cash-withdrawal transaction to be declined due to insufficient cash at the terminal device 106. In another embodiment, the terminal device 106 may check the availability of cash before communicating the cash-withdrawal transaction request to the issuer server 112. This scenario is explained in detail in conjunction with FIG. 3.

Figure 3:
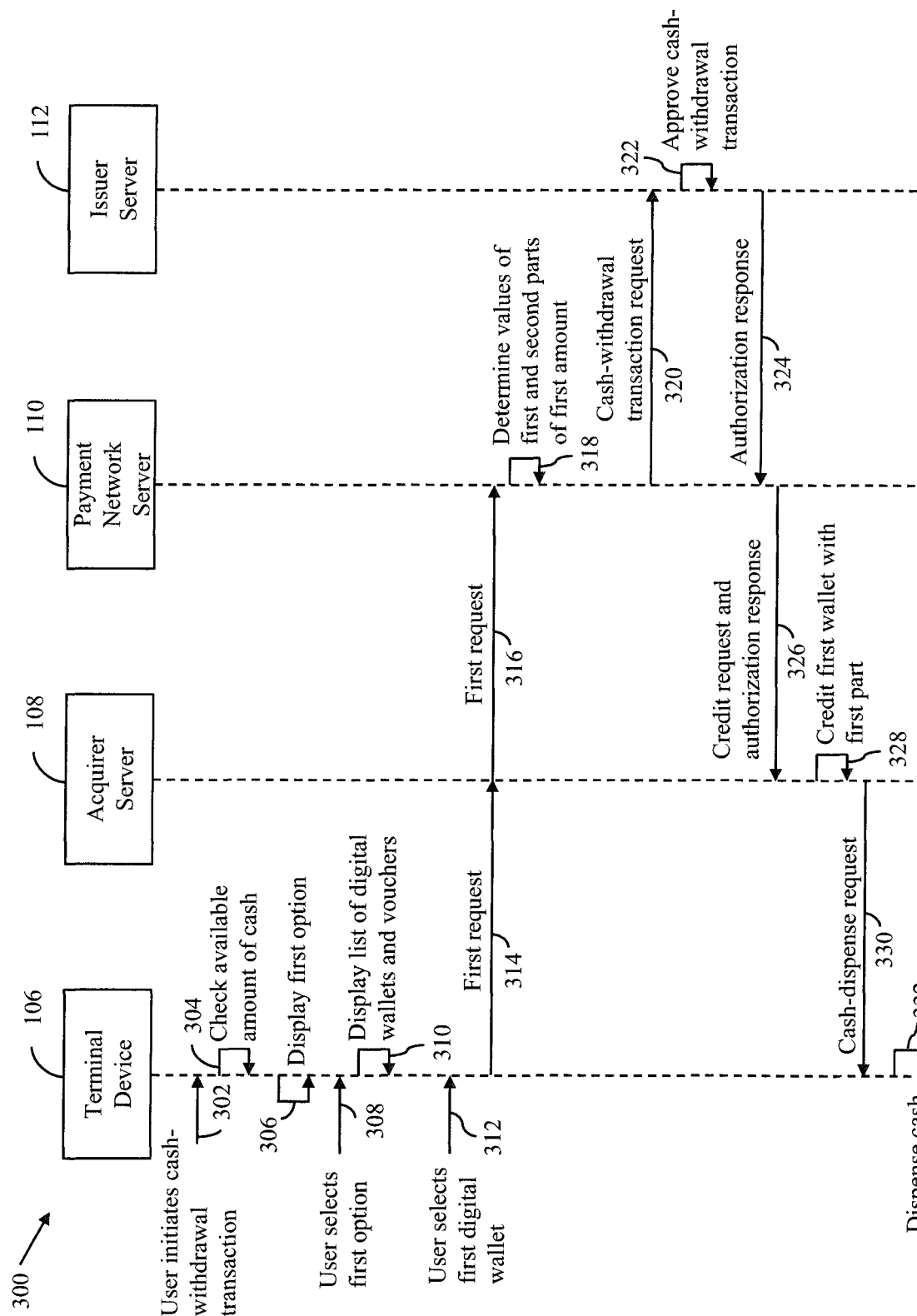
FIG. 3 is a process flow diagram that illustrates another exemplary scenario for processing cash-withdrawal transactions, in accordance with another embodiment of the present invention.

FIG. 3 is a process flow diagram 300 that illustrates another exemplary scenario for processing cash-withdrawal transactions, in accordance with another embodiment of the present invention. The process flow diagram 300 involves the terminal device 106, the acquirer server 108, the payment network server 110, and the issuer server 112.

A cash-withdrawal transaction is initiated by the user 102 at the terminal device 106 for withdrawing a first amount (i.e., the transaction amount, for example, $1,000) of cash (as shown by arrow 302). The terminal device 106 checks whether the available amount of cash (i.e., the second amount) is greater than the first amount (as shown by arrow 304). In a non-limiting example, it is assumed that the second amount is equal to $100, which is less than the first amount (i.e., $1,000). When the first amount (i.e., $1,000) is determined to be greater than the second amount (i.e., $100), the terminal device 106 notifies the user 102 and displays the first option for selection (as shown by arrow 306). In a non-limiting example, it is assumed that the first option is selected by the user 102 (as shown by arrow 308). The first option, when selected, allows the user 102 to receive a first part of the first amount, which the terminal device 106 is falling short of, as one of a voucher or credit in a digital wallet. In this example, the first part of the first amount is equal to $900, which is a difference of the first amount and the second amount. When the first option is selected by the user 102, the terminal device 106 displays a list of digital wallets and vouchers to the user 102 for selection (as shown by arrow 310). In a non-limiting example, it is assumed that a second digital wallet that is maintained at the acquirer server 108 is selected by the user 102 from the list of digital wallets and vouchers (as shown by arrow 312). The selection of the first option and the second digital wallet indicates that the user 102 has agreed to receive the first part (i.e., $900) of the first amount as credit in the second digital wallet and a second part of the first amount as cash. The second part is same as the second amount $100. When the second digital wallet is selected by the user 102, the terminal device 106 may prompt the user 102 to provide a unique wallet identifier of the second digital wallet. The unique wallet identifier may be a wallet ID that uniquely identifies the second digital wallet, a mobile number linked to the second digital wallet, an email ID linked to the second digital wallet, or a combination thereof.

The terminal device 106 communicates to the acquirer server 108 the first request indicating the selection of the first option and the second digital wallet (as shown by arrow 314). The first request includes the unique wallet identifier provided by the user 102. The acquirer server 108 communicates the first request to the payment network server 110 (as shown by arrow 316). By way of the first request, the payment network server 110 is notified that the user 102 has provided consent to receive the first part (i.e., $900) as credit in the second digital wallet. The payment network server 110 then determines values of the first and second parts of the first amount (as shown by arrow 318).

The payment network server 110 further identifies the issuer that corresponds to the cash-withdrawal transaction, as known by those skilled in the art. Once the issuer is identified, the payment network server 110 communicates the cash-withdrawal transaction request to the issuer server 112 of the identified issuer (as shown by arrow 320). The issuer server 112 approves the cash-withdrawal transaction request (as shown by arrow 322) and communicates an authorization response to the payment network server 110 (as shown by arrow 324). The payment network server 110 communicates the authorization response to the acquirer server 108 (as shown by arrow 326). When the authorization response indicates that the cash-withdrawal transaction is approved by the issuer server 112, the payment network server 110 further communicates a credit request to the acquirer server 108 that maintains the second digital wallet for crediting the first part (i.e., $900) of the first amount to the second digital wallet (as shown by arrow 326). The credit request includes the unique wallet identifier provided by the user 102 and the value of the first part. Based on the credit request, the acquirer server 108 identifies the second digital wallet and credits the first part (i.e., $900) of the first amount to the second digital wallet (as shown by arrow 328). The acquirer server 108 then communicates a cash-dispense request to the terminal device 106 for dispensing cash equivalent to the second part (i.e., $100) of the first amount (as shown by arrow 330). Based on the cash-dispense request, the terminal device 106 dispenses the second part (i.e., $100) of the first amount as cash (as shown by arrow 332). The issuer server 112 deducts the first amount (i.e., $1,000) from the user account of the user 102. In another exemplary scenario, the second amount may be equal to zero. In this case, the first part is same as the first amount. Thus, the first amount is credited to the second digital wallet and the terminal device 106 does not dispense any cash.

In another embodiment, the issuer server 112 may not approve the cash-withdrawal transaction due to insufficient balance in the user account. In another embodiment, the user 102 may not select the first option presented on the terminal device 106, thus causing the cash-withdrawal transaction to be declined due to insufficient cash at the terminal device 106. In another embodiment, the terminal device 106 may check the availability of cash after the cash-withdrawal transaction request is authorized by the issuer server 112 as explained in FIG. 2.

Figure 4:
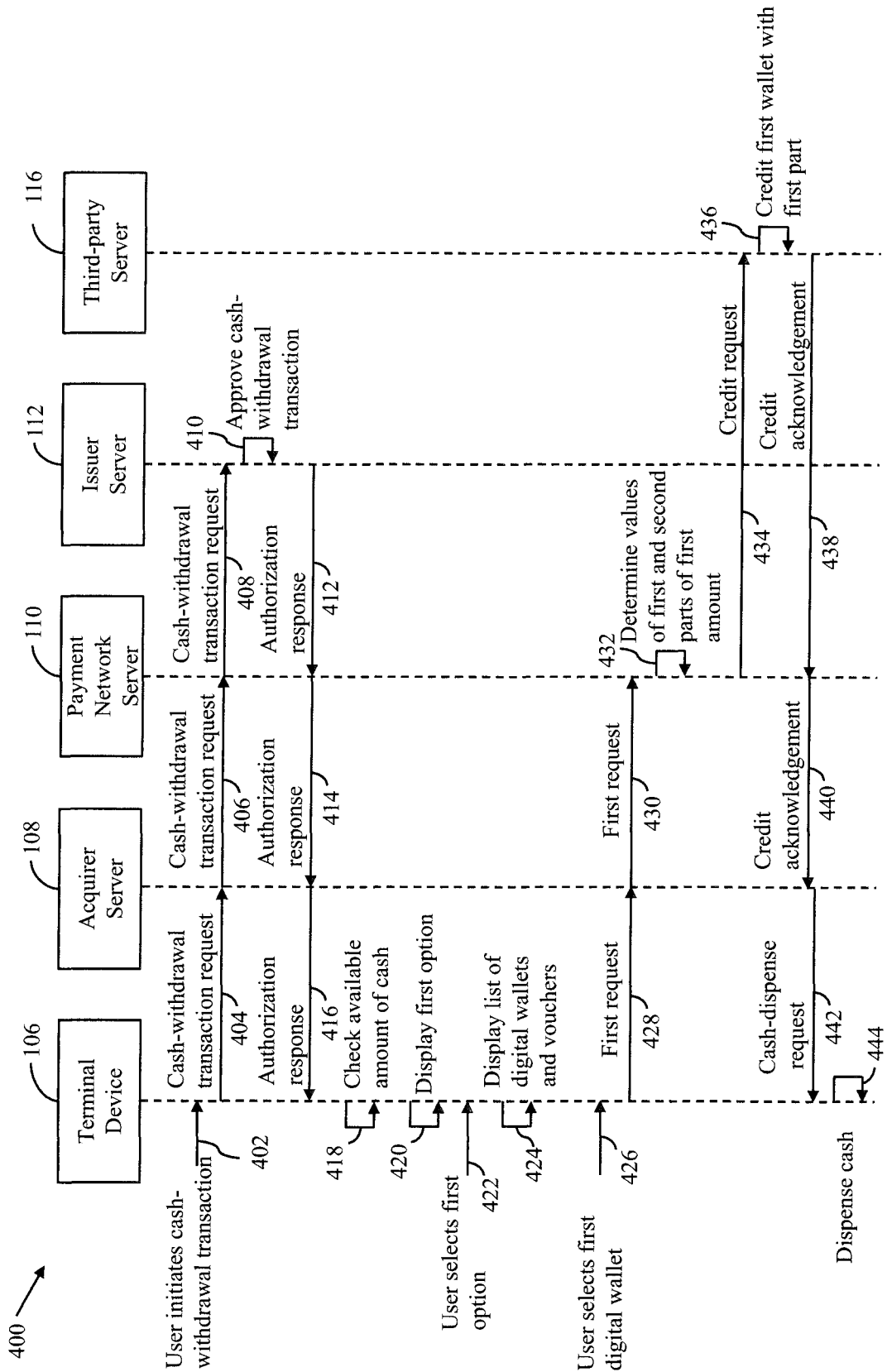
FIG. 4 is a process flow diagram that illustrates yet another exemplary scenario for processing cash-withdrawal transactions, in accordance with yet another embodiment of the present invention.

FIG. 4 is a process flow diagram 400 that illustrates yet another exemplary scenario for processing cash-withdrawal transactions, in accordance with yet another embodiment of the present invention. The process flow diagram 400 involves the terminal device 106, the acquirer server 108, the payment network server 110, the issuer server 112, and the third-party server 116.

A cash-withdrawal transaction is initiated at the terminal device 106 by the user 102 for withdrawing a first amount (i.e., the transaction amount, for example, $800) of cash (as shown by arrow 402). The terminal device 106 communicates a cash-withdrawal transaction request to the acquirer server 108 (as shown by arrow 404). The cash-withdrawal transaction request includes the transaction details (such as card details, account information, a transaction amount, a timestamp, a transaction ID, or the like) of the cash-withdrawal transaction. The acquirer server 108 identifies a payment network that corresponds to the cash-withdrawal transaction, as known by those skilled in the art. The acquirer server 108 communicates the cash-withdrawal transaction request to the payment network server 110 of the identified payment network (as shown by arrow 406). The payment network server 110 receives the cash-withdrawal transaction request and identifies the issuer that corresponds to the cash-withdrawal transaction, as known by those skilled in the art. Once the issuer is identified, the payment network server 110 communicates the cash-withdrawal transaction request to the issuer server 112 of the identified issuer (as shown by arrow 408). The issuer server 112 approves the cash-withdrawal transaction request (as shown by arrow 410) and communicates an authorization response to the payment network server 110 (as shown by arrow 412). The payment network server 110 communicates the authorization response to the acquirer server 108 (as shown by arrow 414) and the acquirer server 108 communicates the authorization response to the terminal device 106 (as shown by arrow 416). By way of the authorization response, the terminal device 106 is notified that the cash-withdrawal transaction has been approved by the issuer. The terminal device 106 then checks whether the available amount of cash (i.e., the second amount) is less than the first amount (as shown by arrow 418). In a non-limiting example, it is assumed that the second amount is equal to $600, which is less than the first amount (i.e., $800). When the first amount (i.e., $800) is determined to be greater than the second amount (i.e., $600), the terminal device 106 notifies the user 102 and displays a first option for selection (as shown by arrow 420). In a non-limiting example, it is assumed that the first option is selected by the user 102 (as shown by arrow 422). The first option, when selected, allows the user 102 to receive a first part (i.e., $200) of the first amount, which the terminal device 106 is falling short of, as one of a voucher or credit in a digital wallet. When the first option is selected by the user 102, the terminal device 106 displays a list of digital wallets and vouchers to the user 102 for selection (as shown by arrow 424). In a non-limiting example, it is assumed that a third digital wallet maintained at the third-party server 116 is selected by the user 102 from the list of digital wallets and vouchers (as shown by arrow 426). The selection of the first option and the third digital wallet indicates that the user 102 has agreed to receive the first part (i.e. $200) of the first amount as credit in the third digital wallet and a second part (i.e., $800–$200=$600) of the first amount as cash. The second part is same as the second amount. When the third digital wallet is selected by the user 102, the terminal device 106 may prompt the user 102 to provide a unique wallet identifier of the third digital wallet. The unique wallet identifier may be a wallet ID that uniquely identifies the third digital wallet, a mobile number linked to the third digital wallet, an email ID linked to the third digital wallet, or a combination thereof.

The terminal device 106 communicates to the acquirer server 108 the first request indicating the selection of the first option and the third digital wallet by the user 102 (as shown by arrow 428). The first request includes the unique wallet identifier provided by the user 102. The acquirer server 108 communicates the first request to the payment network server 110 (as shown by arrow 430). By way of the first request, the payment network server 110 is notified that the user 102 has agreed to receive the first part (i.e., $200) as credit in the third digital wallet. The payment network server 110 determines the values of the first and second parts of the first amount (as shown by arrow 432). Since the third digital wallet is maintained at the third-party server 116, the payment network server 110 communicates a credit request to the third-party server 116 for crediting the first part (i.e., $200) of the first amount to the third digital wallet (as shown by arrow 434). The credit request includes the unique wallet identifier provided by the user 102 and the value of the first part. Based on the credit request, the third-party server 116 identifies the third digital wallet and credits the first part (i.e., $200) of the first amount to the third digital wallet (as shown by arrow 436). When the third digital wallet is successfully credited with the first part (i.e., $200), the third-party server 116 communicates a credit acknowledgement to the payment network server 110 (as shown by arrow 438) and the payment network server 110 communicates the credit acknowledgement to the acquirer server 108 (as shown by arrow 440). The acquirer server 108 communicates a cash-dispense request to the terminal device 106 for dispensing cash equivalent to the second part (i.e., $600) of the first amount (as shown by arrow 442). Based on the cash-dispense request, the terminal device 106 dispenses the second part (i.e., $600) of the first amount as cash (as shown by arrow 444). The issuer server 112 deducts the first amount (i.e., $800) from the user account of the user 102. In another exemplary scenario, the second amount may be equal to zero. In this case, the first part is same as the first amount. Thus, the first amount is credited to the third digital wallet and the terminal device 106 does not dispense any cash.

In another embodiment, the issuer server 112 may not approve the cash-withdrawal transaction due to insufficient balance in the user account. In such a scenario, the terminal device 106 does not present the first option to the user 102. In another embodiment, the user 102 may not select the first option presented on the terminal device 106, thus causing the cash-withdrawal transaction to be declined due to insufficient cash at the terminal device 106. In another embodiment, the terminal device 106 may check the availability of cash before communicating the cash-withdrawal transaction request to the issuer server 112 as explained in FIG. 3. In yet another embodiment, the user 102 may select another digital wallet that is maintained at the payment network server 110 from the displayed list of digital wallets and vouchers. In such a scenario, the first part is credited to the selected digital wallet by the payment network server 110.

Figure 5:
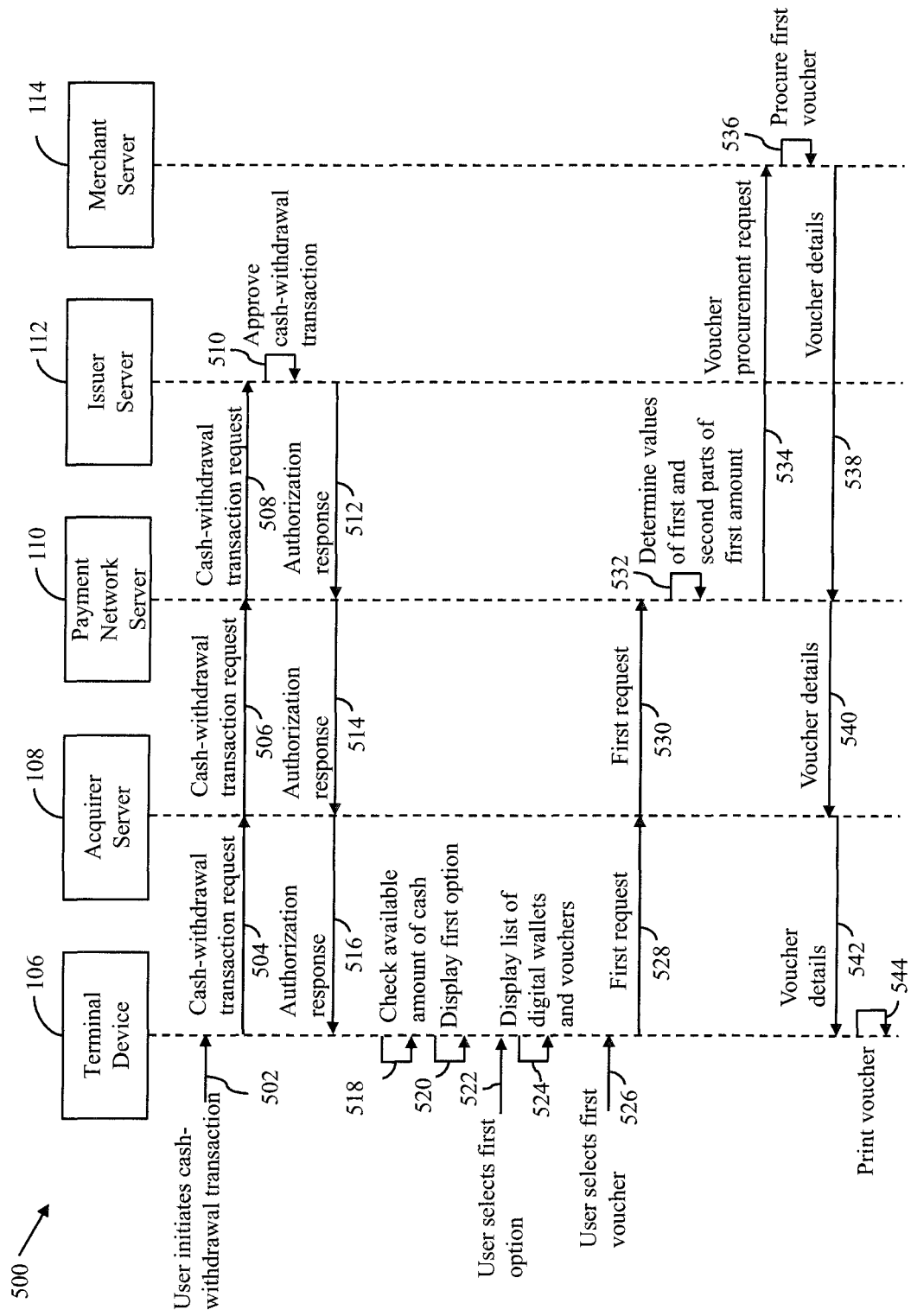
FIG. 5 is a process flow diagram that illustrates yet another exemplary scenario for processing cash-withdrawal transactions, in accordance with yet another embodiment of the present invention.

FIG. 5 is a process flow diagram 500 that illustrates yet another exemplary scenario for processing cash-withdrawal transactions, in accordance with yet another embodiment of the present invention. The process flow diagram 500 involves the terminal device 106, the acquirer server 108, the payment network server 110, the issuer server 112, and the merchant server 114.

A cash-withdrawal transaction is initiated at the terminal device 106 by the user 102 for withdrawing a first amount (i.e., the transaction amount, for example, $2,000) of cash (as shown by arrow 502). The terminal device 106 communicates a cash-withdrawal transaction request to the acquirer server 108 (as shown by arrow 504). The cash-withdrawal transaction request includes the transaction details (such as card details, account information, a transaction amount, a timestamp, a transaction ID, or the like) of the cash-withdrawal transaction. The acquirer server 108 identifies a payment network that corresponds to the cash-withdrawal transaction, as known by those skilled in the art. The acquirer server 108 communicates the cash-withdrawal transaction request to the payment network server 110 of the identified payment network (as shown by arrow 506). The payment network server 110 receives the cash-withdrawal transaction request and identifies the issuer that corresponds to the cash-withdrawal transaction, as known by those skilled in the art. Once the issuer is identified, the payment network server 110 communicates the cash-withdrawal transaction request to the issuer server 112 of the identified issuer (as shown by arrow 508). The issuer server 112 approves the cash-withdrawal transaction request (as shown by arrow 510) and communicates an authorization response to the payment network server 110 (as shown by arrow 512). The payment network server 110 communicates the authorization response to the acquirer server 108 (as shown by arrow 514) and the acquirer server 108 communicates the authorization response to the terminal device 106 (as shown by arrow 516). By way of the authorization response, the terminal device 106 is notified that the cash-withdrawal transaction has been approved by the issuer. The terminal device 106 then checks whether the available amount of cash (i.e., the second amount) is less than the first amount (as shown by arrow 518). In a non-limiting example, it is assumed that the terminal device 106 is dry and has no cash available. When the first amount is determined to be greater than the second amount, the terminal device 106 notifies the user 102 and displays a first option for selection (as shown by arrow 520). In a non-limiting example, it is assumed that the first option is selected the user 102 (as shown by arrow 522). The first option, when selected, allows the user 102 to receive a first part of the first amount, which the terminal device 106 is falling short of, as one of a voucher or credit in a digital wallet. In this scenario, the first part is same as the first amount $2,000. When the first option is selected by the user 102, the terminal device 106 displays a list of digital wallets and vouchers to the user 102 for selection (as shown by arrow 524). In a non-limiting example, it is assumed that a first voucher offered by the merchant server 114 is selected by the user 102 from the list of digital wallets and vouchers (as shown by arrow 526). The selection of the first option and the first voucher indicates that the user 102 has agreed to receive the first part of the first amount as the first voucher. In this scenario, the second part of the first amount is zero. In one embodiment, when the first voucher is selected by the user 102, the terminal device 106 may prompt the user 102 to provide contact information, such as a mobile number and/or an email ID, on which the details of the first voucher may be communicated to the user 102.

The terminal device 106 communicates to the acquirer server 108 the first request indicating the selection of the first option and the first voucher by the user 102 (as shown by arrow 528). The first request includes the contact information provided by the user 102. The acquirer server 108 communicates the first request to the payment network server 110 (as shown by arrow 530). By way of the first request, the payment network server 110 is notified that the user 102 has provided consent to receive the first part as the first voucher. The payment network server 110 then determines the values of the first and second parts of the first amount (as shown by arrow 532). Since the first voucher is offered by the merchant server 114, the payment network server 110 communicates a voucher procurement request to the merchant server 114 for procuring the first voucher from the merchant server 114 (as shown by arrow 534). The voucher procurement request may include the contact information provided by the user 102 and the value of the first part. Based on the voucher procurement request, the merchant server 114 generates the first voucher equivalent to the value of the first part (i.e., $2,000) (as shown by arrow 536). When the first voucher is successfully generated, the merchant server 114 communicates voucher details of the first voucher to the payment network server 110 (as shown by arrow 538) and the payment network server 110 communicates the voucher details to the acquirer server 108 (as shown by arrow 540). The acquirer server 108 communicates the voucher details to the terminal device 106 (as shown by arrow 542). Based on the received the voucher details, the terminal device 106 may print the first voucher for the user 102 (as shown by arrow 544). The first voucher may be redeemable by the user 102. In another embodiment, the terminal device 106 may display the details of the first voucher to the user 102. The issuer server 112 deducts the first amount (i.e., $2,000) from the user account of the user 102.

In another exemplary scenario, the second amount may not be equal to zero. In this case, the acquirer server 108 may transmit a cash-dispense request along with the voucher details to the terminal device 106 for dispensing a second part of the first amount that is available at the terminal device 106 as cash. Based on the cash dispense request, the terminal device 106 dispenses the second part as cash. In another embodiment, the merchant server 114 or the payment network server 110 may utilize the contact information provided by the user 102 for communicating the details of the first voucher to the user 102.

In another embodiment, the issuer server 112 may not approve the cash-withdrawal transaction due to insufficient balance in the user account. In such a scenario, the terminal device 106 does not present the first option to the user 102. In another embodiment, the user 102 may not select the first option presented on the terminal device 106, thus causing the cash-withdrawal transaction to be declined due to insufficient cash. In another embodiment, the terminal device 106 may check the availability of cash before communicating the cash-withdrawal transaction request to the issuer server 112 as explained in FIG. 3.

Figure 6:
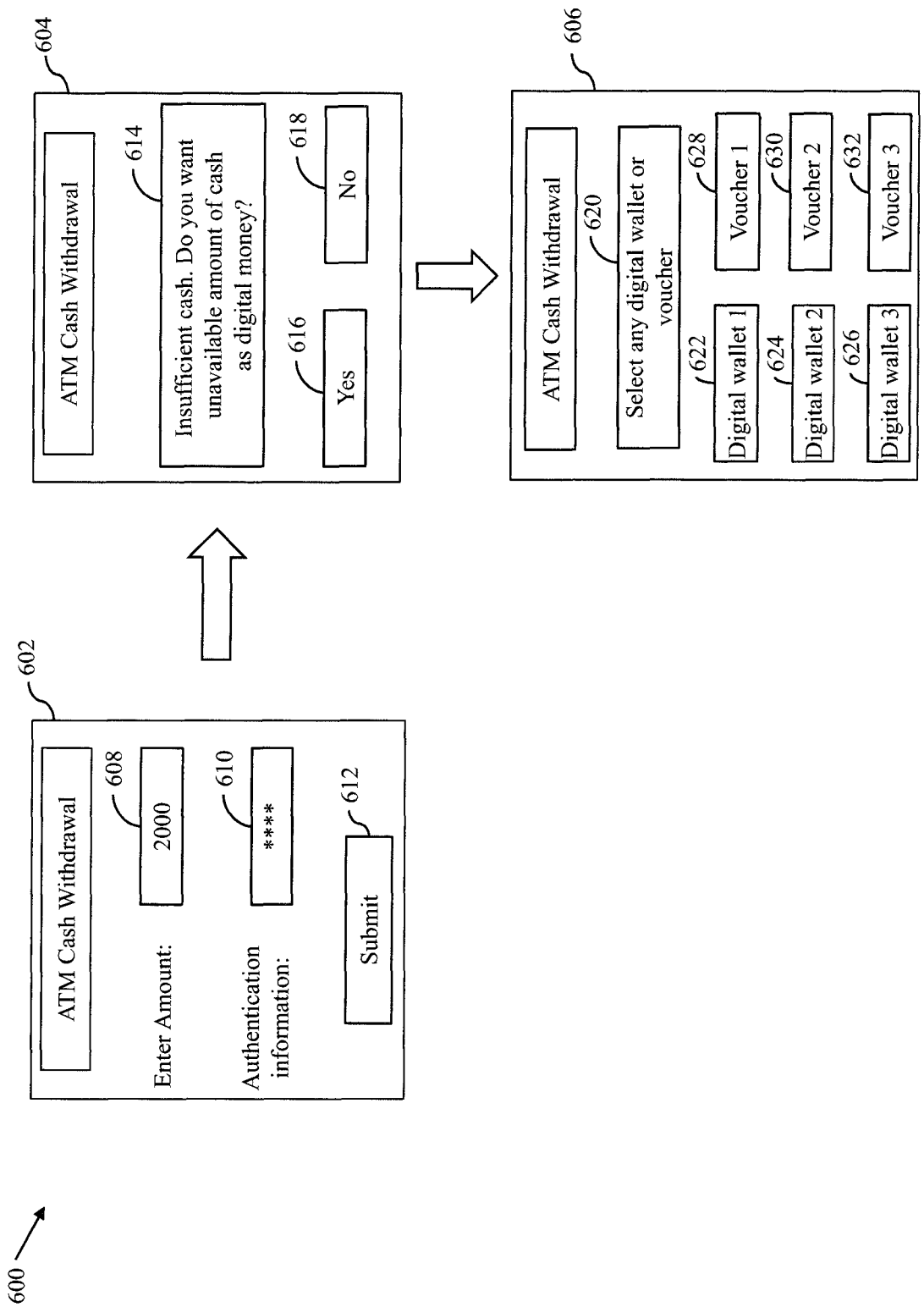
FIG. 6 is an exemplary scenario that illustrates user interface (UI) screens that are rendered on a terminal device of FIG. 1 for enabling a user to perform a cash-withdrawal transaction, in accordance with an embodiment of the present invention.

FIG. 6 is an exemplary scenario 600 that illustrates first through third user interface (UI) screens 602, 604, and 606 that are rendered on the terminal device 106 for enabling the user 102 to perform the cash-withdrawal transaction, in accordance with an embodiment of the present invention.

When the cash-withdrawal transaction is requested by the user 102 at the terminal device 106, the first UI screen 602 is rendered on a display (not shown) of the terminal device 106. The first UI screen 602 displays a first input box 608 that allows the user 102 to enter the first amount (i.e., the transaction amount, for example, $2,000) for the cash-withdrawal transaction. In one embodiment, the first UI screen 602 may display a second input box 610 that allows the user 102 to enter authentication information (for example, one-time password, personal identification number, and/or alphanumeric password) associated with the transaction card 104 of the user 102. In another embodiment, when the terminal device 106 conducts biometric authentication by way of fingerprint, voiceprint, faceprint, retina scan, and/or the like, the first UI screen 602 may not display the second input box 610. The first UI screen 602 further displays a first submit button 612, which is selectable by the user 102. When the first amount and the authentication information are entered in the first and second input boxes 608 and 610, respectively, and the first submit button 612 is selected, the terminal device 106 communicates the cash-withdrawal transaction request to the acquirer server 108.

After the cash-withdrawal transaction is authorized by the issuer server 112, the terminal device 106 checks whether the available cash is sufficient to cover the first amount requested by the user 102. If the available cash (i.e., the second amount) is insufficient, the terminal device 106 renders the second UI screen 604 and displays a message in a first text box 614 to notify the user 102 that the terminal device 106 has insufficient cash. The message further presents the first option to the user 102 to receive the first part of the first amount that the terminal device 106 is falling short of as digital money and the remaining as cash. The user 102 may select the first option by selecting a 'Yes' button 616 displayed by the second UI screen 604. The user 102 may further reject the first option by selecting a 'No' button 618 displayed by the second UI screen 604. When the user 102 selects the 'Yes' button 616, the terminal device 106 renders the third UI screen 606.

The third UI screen 606 displays another message in a second text box 620 for prompting the user 102 to select any digital wallet or voucher from a list of digital wallets and vouchers. In a non-limiting example, the list of digital wallets and vouchers is shown to include digital wallets 1, 2, and 3 represented by buttons 622, 624, and 626, respectively, and vouchers 1, 2, and 3 represented by buttons 628, 630, and 632, respectively. The user 102 may select any one of the buttons 622-632. When the user 102 selects any of the buttons 622-632, the terminal device 106 communicates the first request indicating the selection of the first option to the payment network server 110. Based on the first request, the payment network server 110 either procures the selected voucher for the user 102 or initiates crediting of the selected digital wallet as explained in the foregoing in FIGS. 2-5.

Figure 7:
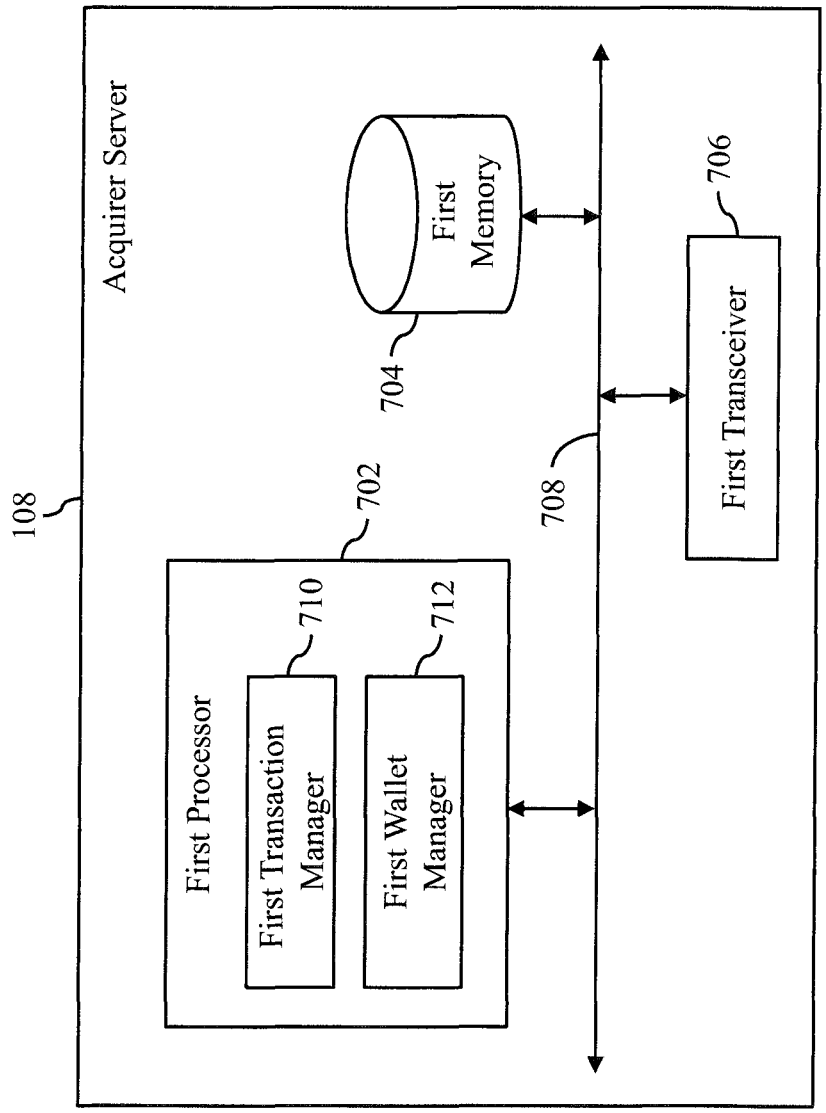
FIG. 7 is a block diagram that illustrates an acquirer server of FIG. 1, in accordance with an embodiment of the present invention.

FIG. 7 is a block diagram that illustrates the acquirer server 108, in accordance with an embodiment of the present invention. The acquirer server 108 includes a first processor 702, a first memory 704, and a first transceiver 706. The first processor 702, the first memory 704, and the first transceiver 706 communicate with each other by way of a first communication bus 708.

The first processor 702 includes suitable logic, circuitry, interfaces and/or codes, executable by the circuitry, to process transactions (e.g., cash-withdrawal transactions) performed at the terminal device 106. When a digital wallet maintained at the acquirer server 108 is selected by the user 102 for receiving the first part of the first amount as credit, the acquirer server 108 receives the credit request from the payment network server 110. The first processor 702 credits the selected digital wallet with an amount equivalent to the first part based on the credit request as described in FIG. 3. Examples of the first processor 702 include, but are not limited to, an application specific integrated circuit (ASIC) processor, a reduced instruction set computer (RISC) processor, a complex instruction set computer (CISC) processor, a field programmable gate array (FPGA), or the like. The first processor 702 includes a first transaction manager 710 and a first wallet manager 712.

The first transaction manager 710 processes the transactions that correspond to the acquirer server 108. For example, when the acquirer server 108 receives a cash-withdrawal transaction request from the terminal device 106, the first transaction manager 710 identifies a payment network that corresponds to the cash-withdrawal transaction. The cash-withdrawal transaction request is then communicated to a payment network server (for example, the payment network server 110) of the identified payment network. When the acquirer server 108 receives an authorization response and/or a cash-dispense request from the payment network server 110, the first transaction manager 710 identifies a terminal device (for example, the terminal device 106) that corresponds to the authorization response and/or the cash-dispense request. The authorization response and/or the cash-dispense request is then communicated to the identified terminal device. The first wallet manager 712 enables the acquirer server 108 to offer the digital wallet service to various users, such as the user 102, and maintains the digital wallets of the users who have registered with the acquirer server 108 for availing the digital wallet service. The first wallet manager 712, further, credits the first part of the first amount to a digital wallet selected by the user 102 based on the credit request and generates the credit-acknowledgement which is communicated to the payment network server 110 as described in FIG. 3.

The first memory 704 includes suitable logic, circuitry, interfaces and/or codes, executable by the circuitry, to store information pertaining to the digital wallets of the users that are maintained at the acquirer server 108. Examples of the first memory 704 include a random access memory (RAM), a read-only memory (ROM), a removable storage drive, a hard-disk drive (HDD), a flash memory, a solid-state memory, or the like. It will be apparent to a person skilled in the art that the scope of the invention is not limited to realizing the first memory 704 in the acquirer server 108, as described herein. In another embodiment, the first memory 704 may be realized in form of a database server or a cloud storage working in conjunction with the acquirer server 108, without departing from the scope of the invention.

The first transceiver 706 transmits and receives data over the communication network 118 using one or more communication protocols. The first transceiver 706 may receive various requests and messages from the terminal device 106, the payment network server 110, the issuer server 112, the merchant server 114, the third-party server 116, or other entities that are pursuant to one or more standards for the interchange of transaction messages. For example, the first transceiver 706 receives the cash-withdrawal transaction request and the first request from the terminal device 106 (as described in FIGS. 2-5) and the credit request from the payment network server 110 (as described in FIG. 3). The first transceiver 706 may further transmit various requests and messages to the terminal device 106, the payment network server 110, the issuer server 112, the merchant server 114, and/or the third-party server 116. For example, the first transceiver 706 transmits the cash-withdrawal transaction request and the credit acknowledgement to the payment network server 110. Examples of the first transceiver 706 include, but are not limited to, an antenna, a radio frequency transceiver, a wireless transceiver, a Bluetooth transceiver, an Ethernet port, a universal serial bus (USB port), or any other device configured to transmit and receive data.

Figure 8:
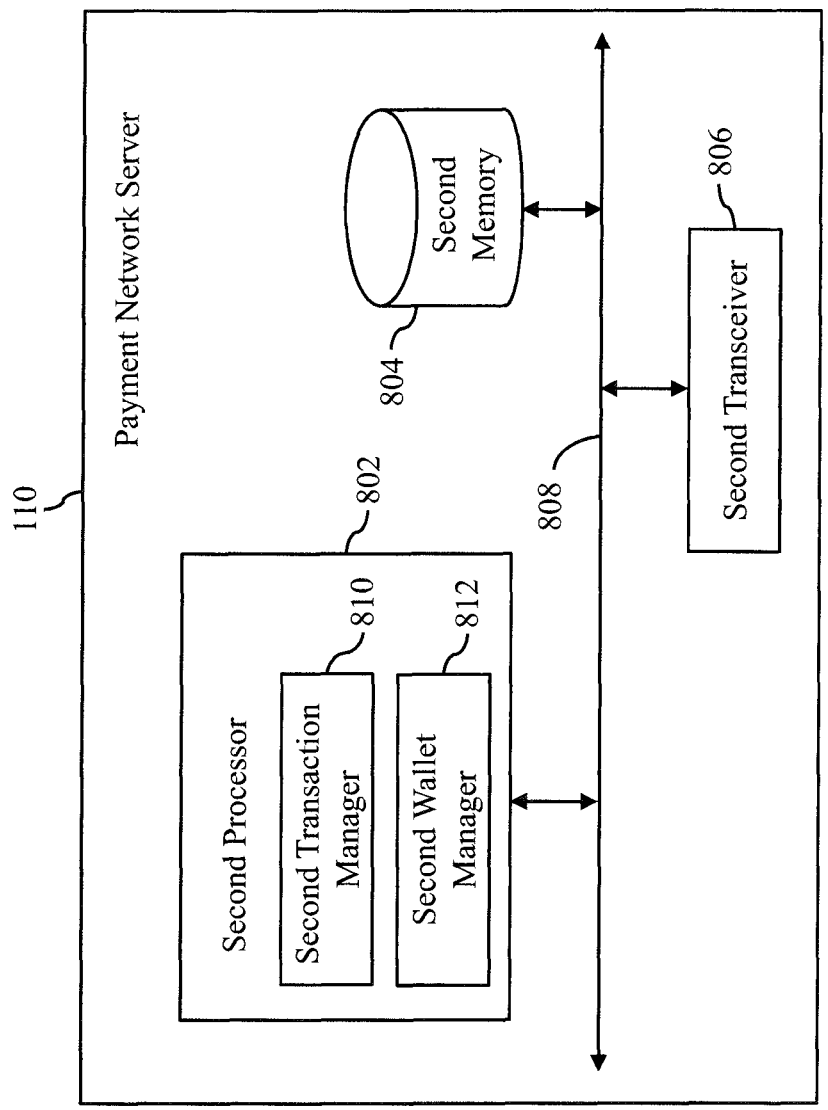
FIG. 8 is a block diagram that illustrates a payment network server of FIG. 1, in accordance with an embodiment of the present invention.

FIG. 8 is a block diagram that illustrates the payment network server 110, in accordance with an embodiment of the present invention. The payment network server 110 includes a second processor 802, a second memory 804, and a second transceiver 806. The second processor 802, the second memory 804, and the second transceiver 806 communicate with each other by way of a second communication bus 808.

The second processor 802 includes suitable logic, circuitry, interfaces and/or codes, executable by the circuitry, to process transactions (e.g., the cash-withdrawal transactions) performed by using the transaction card 104. When a digital wallet maintained at the payment network server 110 is selected the user 102 for receiving the first part of the first amount as credit, the second processor 802 credits the selected digital wallet with an amount equivalent to the first part. Examples of the second processor 802 include, but are not limited to, an ASIC processor, a RISC processor, a CISC processor, a FPGA, or the like. The second processor 802 includes a second transaction manager 810, and a second wallet manager 812.

The second transaction manager 810 performs one or more operations, as known to those skilled in the art, for processing the transactions that correspond to the payment network server 110. In one embodiment, the second transaction manager 810 generates the credit request for initiating crediting of the first part of the first amount to the digital wallet selected by the user 102. In another embodiment, the second transaction manager 810 generates the voucher procurement request for procuring the first voucher from the merchant server 114, when the user 102 selects to receive the first part of the first amount as the first voucher. The second transaction manager 810 determines the values of the first and second parts of the first amount based on the first request received by the payment network server 110 from the acquirer server 108. The second transaction manager 810, further, determines the entity that maintains the digital wallet or offers the voucher selected by the user 102 from the list of digital wallets and vouchers displayed on the terminal device 106. The second wallet manager 812 enables the payment network server 110 to offer the digital wallet service to various users, such as the user 102, and maintains the digital wallets of the users who have registered with the payment network server 110 for availing the digital wallet service. The second wallet manager 812, further, credits the first part of the first amount to a digital wallet selected by the user 102 based on the credit request and generates the credit-acknowledgement which is communicated to the acquirer server 108.

The second memory 804 includes suitable logic, circuitry, interfaces and/or codes, executable by the circuitry, to store information pertaining to the digital wallets of the users that are maintained at the payment network server 110. Examples of the second memory 804 include RAM, a ROM, a removable storage drive, an HDD, a flash memory, a solid-state memory, and the like. It will be apparent to a person skilled in the art that the scope of the invention is not limited to realizing the second memory 804 in the payment network server 110, as described herein. In another embodiment, the second memory 804 may be realized in form of a database server or a cloud storage working in conjunction with the payment network server 110, without departing from the scope of the invention.

The second transceiver 806 transmits and receives data over the communication network 118 using one or more communication protocols. The second transceiver 806 may receive various requests and messages from the terminal device 106, the acquirer server 108, the issuer server 112, the merchant server 114, and/or the third-party server 116. For example, the second transceiver 806 receives the cash-withdrawal transaction request and the first request from the acquirer server 108 (as described in FIGS. 2-5). The second transceiver 806 may further transmit various requests and messages to the terminal device 106, the acquirer server 108, the issuer server 112, the merchant server 114, and/or the third-party server 116. For example, the second transceiver 806 transmits the cash-withdrawal transaction request to the issuer server 112, and the authorization response and the credit acknowledgement to the acquirer server 108. Examples of the second transceiver 806 include, but are not limited to, an antenna, a radio frequency transceiver, a wireless transceiver, a Bluetooth transceiver, an Ethernet port, a USB port, or any other device configured to transmit and receive data.

Figure 9:
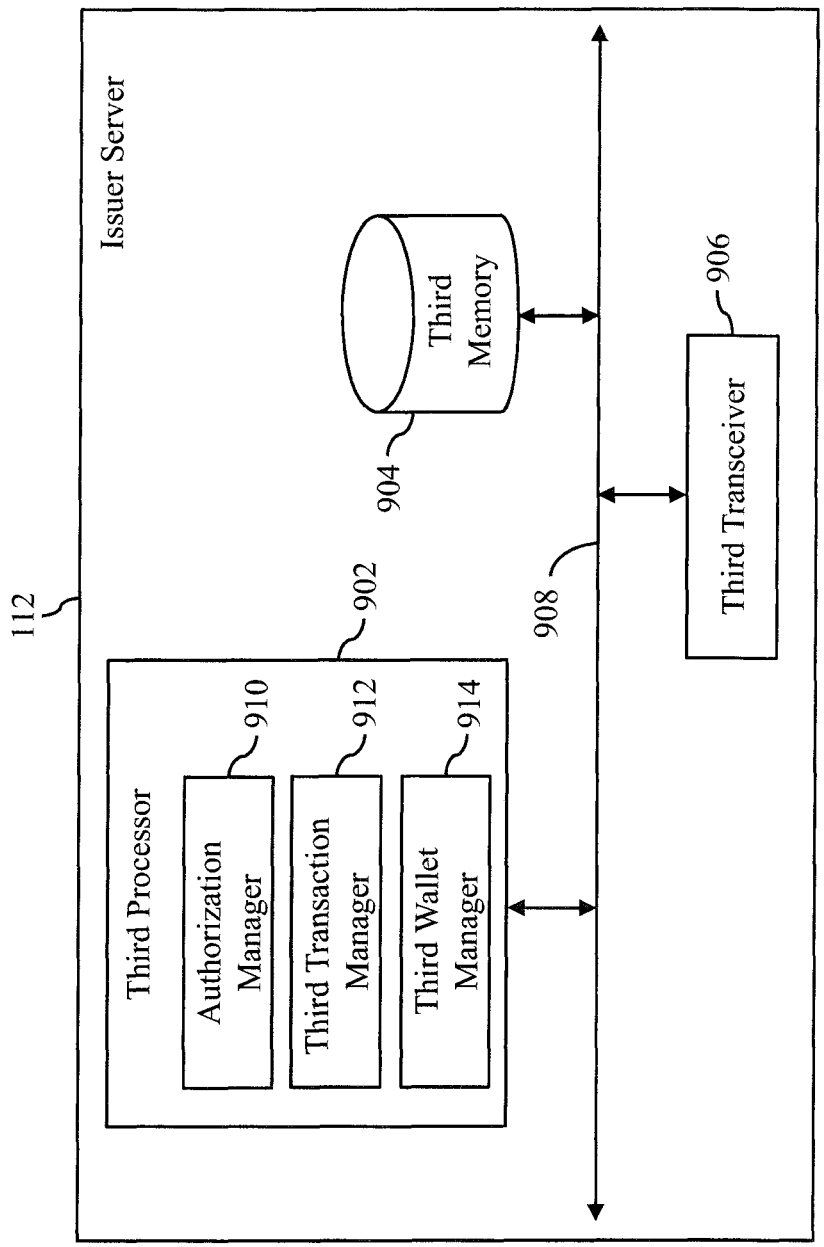
FIG. 9 is a block diagram that illustrates an issuer server of FIG. 1, in accordance with an embodiment of the present invention.

FIG. 9 is a block diagram that illustrates the issuer server 112, in accordance with an embodiment of the present invention. The issuer server 112 includes a third processor 902, a third memory 904, and a third transceiver 906. The third processor 902, the third memory 904, and the third transceiver 906 communicate with each other by way of a third communication bus 908.

The third processor 902 includes suitable logic, circuitry, interfaces and/or codes, executable by the circuitry, to process transactions (e.g., cash-withdrawal transactions) performed by way of the transaction card 104. When a digital wallet maintained at the issuer server 112 is selected by the user 102 for receiving the first part of the first amount as credit, the issuer server 112 receives the credit request from the payment network server 110. The third processor 902 credits the selected digital wallet with an amount equivalent to the first part based on the credit request as described in FIG. 2. Examples of the third processor 902 include, but are not limited to, an ASIC processor, a RISC processor, a CISC processor, a FPGA, and the like. The third processor 902 includes an authorization manager 910, a third transaction manager 912, and a third wallet manager 914.

The authorization manager 910 authorizes the transactions (e.g., cash-withdrawal transactions) that correspond to the issuer server 112 and authenticates users (e.g., the user 102) who perform the transactions. Based on the authorization of the transactions, the authorization manager 910 generates authorization responses. The third transaction manager 912 performs one or more operations, as known to those skilled in the art, for processing the transactions that correspond to the issuer server 112. For example, the third transaction manager 912 deducts the first amount from the user account of the user 102 when the cash-withdrawal transaction is successfully completed. The third transaction manager 912 further generates credit or debit acknowledgements when the user account of the user 102 is credited or debited, respectively. The third wallet manager 914 enables the issuer server 112 to offer the digital wallet service to various users, such as the user 102, and maintains the digital wallets of the users who have registered with the issuer server 112 for availing the digital wallet service. The third wallet manager 914, further, credits the first part of the first amount to a digital wallet selected by the user 102 based on the credit request and generates the credit-acknowledgement which is communicated to the payment network server 110 as described in FIG. 2.

The third memory 904 includes suitable logic, circuitry, interfaces and/or codes, executable by the circuitry, to store information (e.g., account profiles as described in FIG. 1) pertaining to the digital wallets and user accounts of the users that are maintained at the issuer server 112. Examples of the third memory 904 include a RAM, a ROM, a removable storage drive, an HDD, a flash memory, a solid-state memory, and the like. It will be apparent to a person skilled in the art that the scope of the invention is not limited to realizing the third memory 904 in the issuer server 112, as described herein. In another embodiment, the third memory 904 may be realized in form of a database server or a cloud storage working in conjunction with the issuer server 112, without departing from the scope of the invention.

The third transceiver 906 transmits and receives data over the communication network 118 using one or more communication protocols. The third transceiver 906 may receive various requests and messages from the terminal device 106, the acquirer server 108, the payment network server 110, the merchant server 114, the third-party server 116, or other entities that are pursuant to one or more standards for the interchange of transaction messages. For example, the third transceiver 906 receives the cash-withdrawal transaction request from the payment network server 110 (as described in FIGS. 2-5). The third transceiver 906 may further transmit various requests and messages to the terminal device 106, the acquirer server 108, the issuer server 112, the merchant server 114, and/or the third-party server 116. For example, the third transceiver 906 transmits the authorization response and the credit acknowledgement to the payment network server 110. Examples of the third transceiver 906 include, but are not limited to, an antenna, a radio frequency transceiver, a wireless transceiver, a Bluetooth transceiver, an Ethernet port, a USB port, or any other device configured to transmit and receive data.

Figure 10:
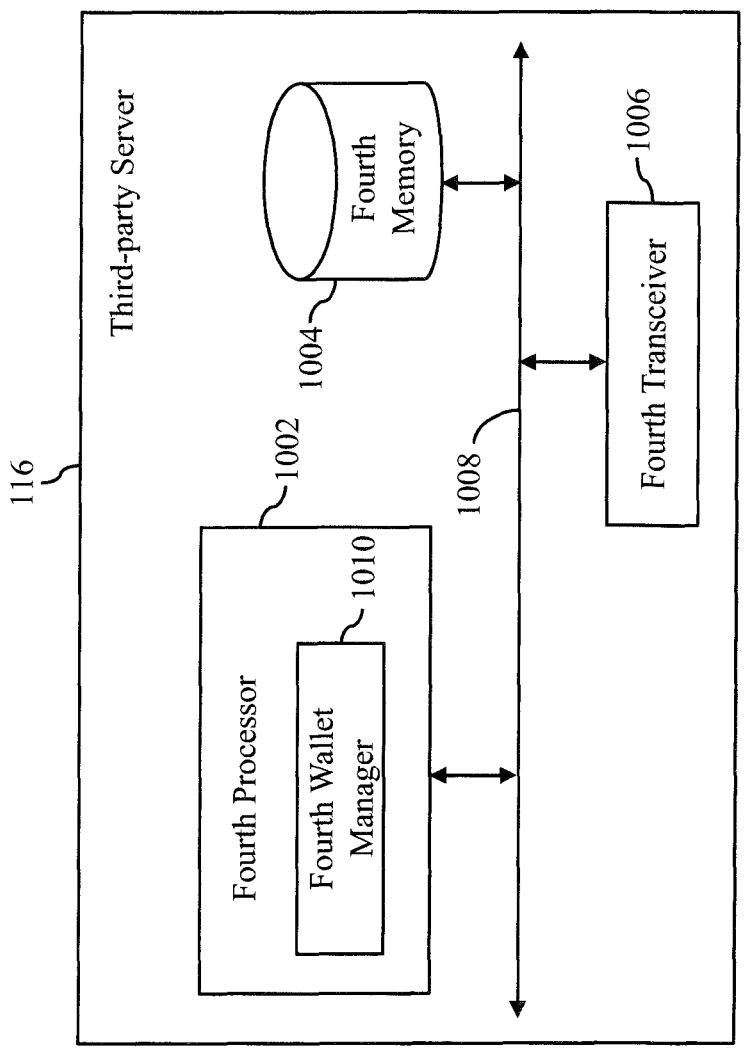
FIG. 10 is a block diagram that illustrates a third-party server of FIG. 1, in accordance with an embodiment of the present invention.

FIG. 10 is a block diagram that illustrates the third-party server 116, in accordance with an embodiment of the present invention. The third-party server 116 includes a fourth processor 1002, a fourth memory 1004, and a fourth transceiver 1006. The fourth processor 1002, the fourth memory 1004, and the fourth transceiver 1006 communicate with each other by way of a fourth communication bus 1008.

The fourth processor 1002 includes suitable logic, circuitry, interfaces and/or codes, executable by the circuitry to manage the digital wallets of various users who have availed the digital wallet service offered by the third-party server 116. When a digital wallet maintained at the third-party server 116 is selected by the user 102 for receiving the first part of the first amount as credit, the third-party server 116 receives the credit request from the payment network server 110. The fourth processor 1002 credits the selected digital wallet with an amount equivalent to the first part based on the credit request and generates the credit-acknowledgement which is communicated to the payment network server 110 as described in FIG. 4. The fourth processor 1002 performs the abovementioned operations by way of a fourth wallet manager 1010. Examples of the fourth processor 1002 include, but are not limited to, an ASIC processor, a RISC processor, a CISC processor, a FPGA, and the like.

The fourth memory 1004 includes suitable logic, circuitry, interfaces and/or codes, executable by the circuitry, to store information pertaining to the digital wallets of the users that are maintained at the third-party server 116. Examples of the fourth memory 1004 include a RAM, a ROM, a removable storage drive, an HDD, a flash memory, a solid-state memory, and the like. It will be apparent to a person skilled in the art that the scope of the invention is not limited to realizing the fourth memory 1004 in the third-party server 116, as described herein. In another embodiment, the fourth memory 1004 may be realized in form of a database server or a cloud storage working in conjunction with the third-party server 116, without departing from the scope of the invention.

The fourth transceiver 1006 transmits and receives data over the communication network 118 using one or more communication protocols. The fourth transceiver 1006 may receive various requests and messages from the payment network server 110 or other entities that are pursuant to one or more standards for the interchange of transaction messages. For example, the fourth transceiver 1006 receives the credit request from the payment network server 110 (as described in FIG. 4). The fourth transceiver 1006 may further transmit various requests and messages to the payment network server 110. For example, the fourth transceiver 1006 transmits the credit acknowledgement to the payment network server 110. Examples of the fourth transceiver 1006 include, but are not limited to, an antenna, a radio frequency transceiver, a wireless transceiver, a Bluetooth transceiver, an Ethernet port, a USB port, or any other device configured to transmit and receive data.

Figure 11:
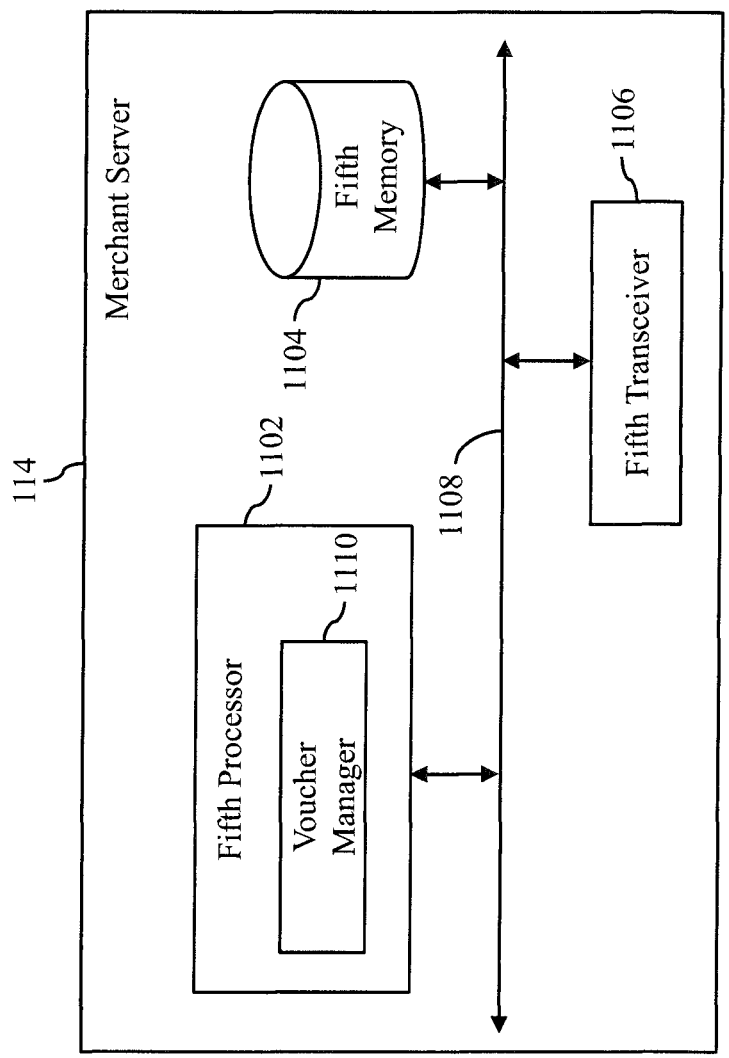
FIG. 11 is a block diagram that illustrates a merchant server of FIG. 1, in accordance with an embodiment of the present invention.

FIG. 11 is a block diagram that illustrates the merchant server 114, in accordance with an embodiment of the present invention. The merchant server 114 includes a fifth processor 1102, a fifth memory 1104, and a fifth transceiver 1106. The fifth processor 1102, the fifth memory 1104, and the fifth transceiver 1106 communicate with each other by way of a fifth communication bus 1108.

The fifth processor 1102 includes suitable logic, circuitry, interfaces and/or codes, executable by the circuitry, to perform one or more operations for voucher generation. When the first voucher maintained at the merchant server 114 is selected by the user 102 from the list of digital wallets and vouchers displayed at the terminal device 106, the merchant server 114 receives the voucher procurement request from the payment network server 110. Based on the received voucher procurement request, the fifth processor 1102 generates the first voucher that is equivalent to the value of the first part. The fifth processor 1102 generates the first voucher by way of a voucher manager 1110. The voucher manager 1110 maintains are record of all the generated vouchers. The record may include a date of generation of each voucher, an expiry date of each voucher, validity period if each voucher, or other voucher related information. When the first voucher is redeemed by the user 102, the voucher manager 1110 validates the first voucher. In a scenario where the voucher manager 1110 that the first voucher is invalid, the voucher manager 1110 may notify the user 102 and decline redemption of the first voucher. Examples of the fifth processor 1102 include, but are not limited to, an ASIC processor, a RISC processor, a CISC processor, a FPGA, or the like.

The fifth memory 1104 includes suitable logic, circuitry interfaces and/or codes, executable by the circuitry, to store the record of the vouchers that are generated by the merchant server 114. Examples of the fifth memory 1104 include a RAM, a ROM, a removable storage drive, an HDD, a flash memory, a solid-state memory, and the like. It will be apparent to a person skilled in the art that the scope of the invention is not limited to realizing the fifth memory 1104 in the merchant server 114, as described herein. In another embodiment, the fifth memory 1104 may be realized in form of a database server or a cloud storage working in conjunction with the merchant server 114, without departing from the scope of the invention.

The fifth transceiver 1106 transmits and receives data over the communication network 118 using one or more communication protocols. The fifth transceiver 1106 may receive various requests and messages from the payment network server 110 or other entities that are pursuant to one or more standards for the interchange of transaction messages. For example, the fifth transceiver 1106 receives the voucher procurement request from the payment network server 110 (as described in FIG. 5). The fifth transceiver 1106 may further transmit various requests and messages to the payment network server 110 or a user device (not shown) of the user 102. For example, the fifth transceiver 1106 transmits the details of the first voucher to the payment network server 110. Examples of the fifth transceiver 1106 include, but are not limited to, an antenna, a radio frequency transceiver, a wireless transceiver, a Bluetooth transceiver, an Ethernet port, a USB port, or any other device configured to transmit and receive data.

Figure 12:
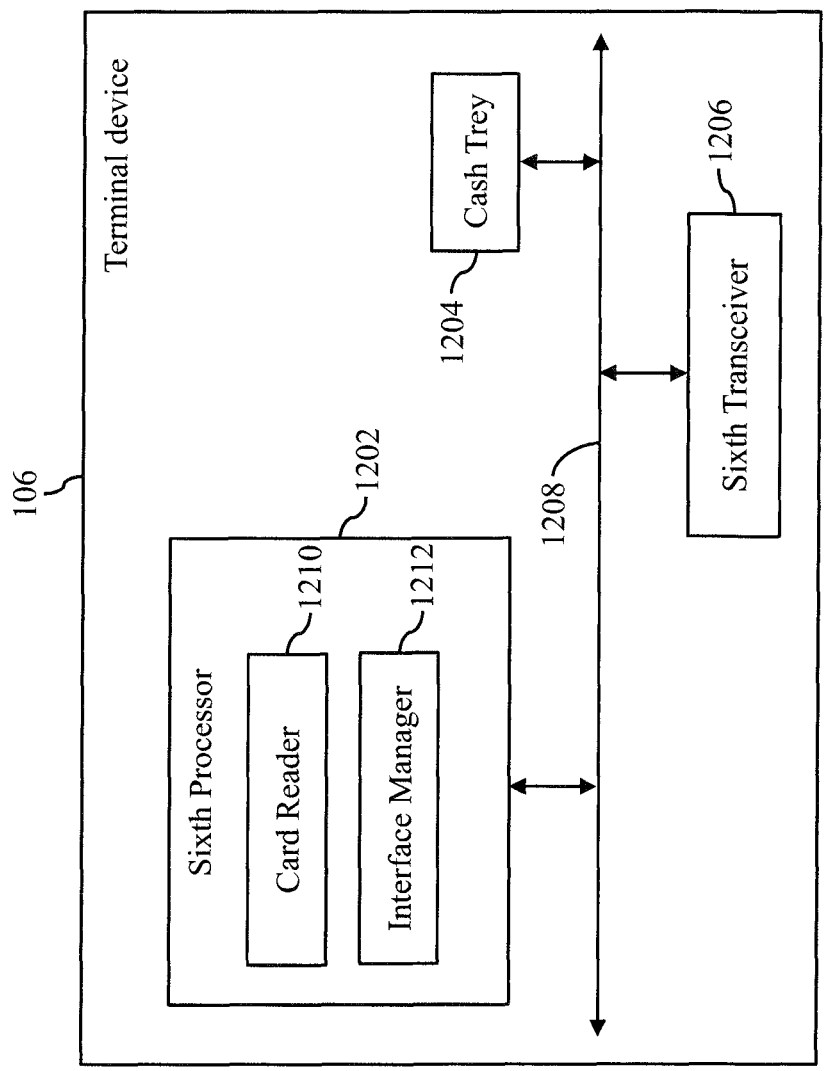
FIG. 12 is a block diagram that illustrates the terminal device of FIG. 1, in accordance with an embodiment of the present invention.

FIG. 12 is a block diagram that illustrates the terminal device 106, in accordance with an embodiment of the present invention. The terminal device 106 includes a sixth processor 1202, a cash trey 1204, and a sixth transceiver 1206. The sixth processor 1202, the cash trey 1204, and the sixth transceiver 1206 communicate with each other by way of a sixth communication bus 1208. The terminal device 106 may further include a memory (not shown) therein.

The sixth processor 1202 includes suitable logic, circuitry, interfaces and/or codes, executable by the circuitry, to process transactions (e.g., cash-withdrawal transactions) performed at the terminal device 106. The sixth processor 1202 generates the cash-withdrawal transaction request when the user 102 interacts with the terminal device 106 to request the cash-withdrawal transaction. Examples of the sixth processor 1202 include, but are not limited to, an ASIC processor, a RISC processor, a CISC processor, a FPGA, and the like. The sixth processor 1202 includes a card reader 1210 and an interface manager 1212. The card reader 1210 may include suitable logic, circuitry, interfaces and/or codes, executable by the circuitry, to read the account information stored in a transaction card (e.g., the transaction card 104). For example, when the user 102 uses the transaction card 104 at the terminal device 106 to perform the cash-withdrawal transaction, the card reader 1210 reads the account information stored in the transaction card 104. The sixth processor 1202 checks whether the amount of cash available in the cash trey 1204 is greater than a transaction amount (i.e., the first amount) of the cash-withdrawal transaction. The interface manager 1212 renders the first through third UI screens 602-606 (as described in FIG. 6) on a display of the terminal device 106 based on instructions received from the sixth processor 1202. For example, when the sixth processor 1202 determines that the amount of cash available in the cash trey 1204 is less than the transaction amount of the cash-withdrawal transaction, the interface manager 1212 renders the second UI screen 604 on the display of the terminal device 106. When the 'Yes' button 616 is selected by the user 102, the interface manager 1212 renders the third UI screen 606 on the display of the terminal device 106.

The sixth transceiver 1206 transmits and receives data over the communication network 118 using one or more communication protocols. The sixth transceiver 1206 may transmit various requests and messages to the acquirer server 108. For example, the sixth transceiver 1206 transmits the cash-withdrawal transaction request and the first request to the acquirer server 108. The sixth transceiver 1206 may further receive various requests and messages from the acquirer server 108. For example, the sixth transceiver 1206 receives the authorization response and the cash-dispense request from the acquirer server 108. Examples of the sixth transceiver 1206 include, but are not limited to, an antenna, a radio frequency transceiver, a wireless transceiver, a Bluetooth transceiver, an Ethernet port, a USB port, or any other device configured to transmit and receive data.

Figure 13A:
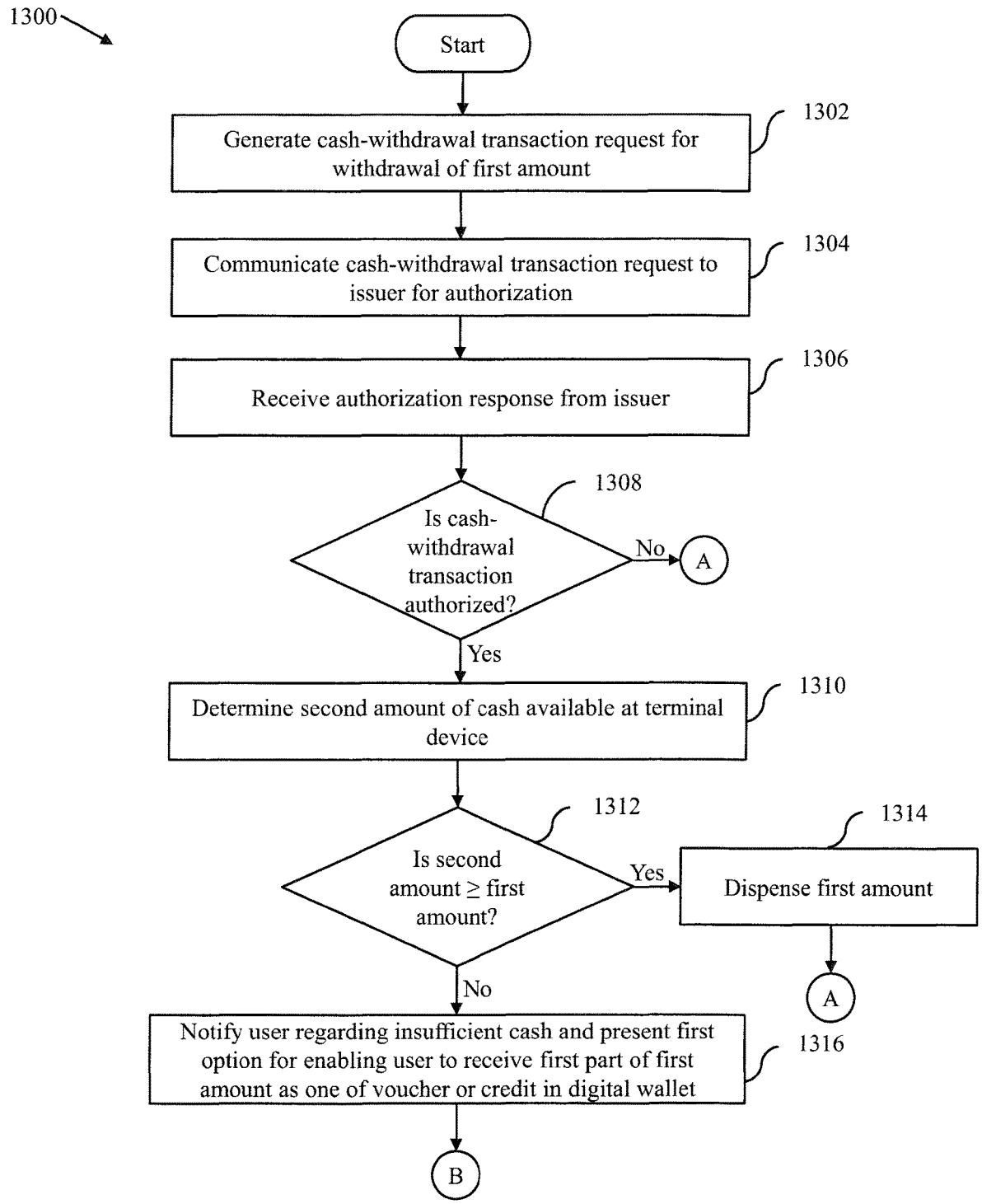
FIGS. 13A and 13B, collectively represent a flow chart that illustrates a method for processing cash-withdrawal transactions, in accordance with an embodiment of the present invention.
Figure 13B:
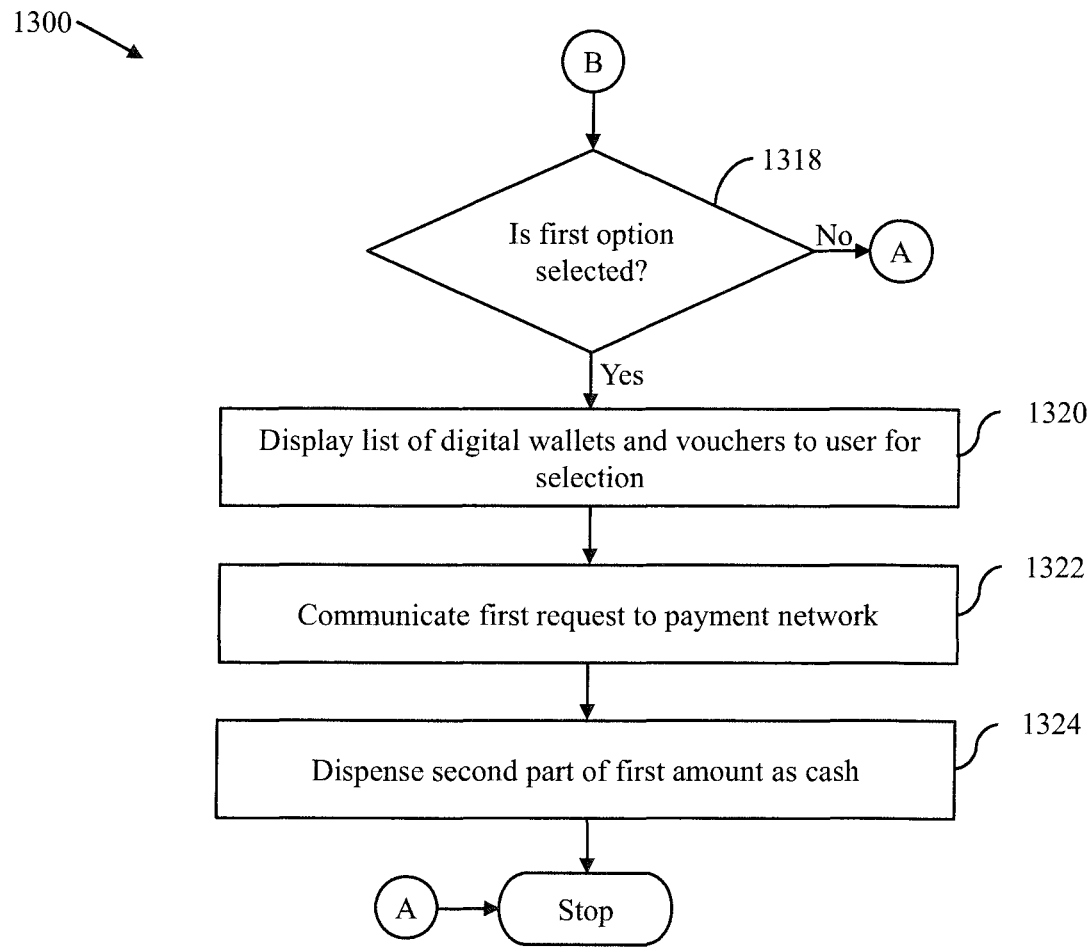

FIGS. 13A and 13B, collectively represent a flow chart 1300 that illustrates a method for processing cash-withdrawal transactions, in accordance with an embodiment of the present invention. The terminal device 106 may be utilized by the user 102 to perform the cash-withdrawal transaction for the first amount. At step 1302, the terminal device 106 generates the cash-withdrawal transaction request for the withdrawal of the first amount. At step 1304, the terminal device 106 communicates the cash-withdrawal transaction request to the issuer server 112 for authorization by way of the acquirer server 108 and the payment network server 110. Based on the cash-withdrawal transaction request, the issuer server 112 authorizes the cash-withdrawal transaction and generates the authorization response. At step 1306, the terminal device 106 receives the authorization response from the issuer server 112 by way of the acquirer server 108 and the payment network server 110.

At step 1308, the terminal device 106 checks whether the cash-withdrawal transaction is authorized based on the authorization response. If at step 1308, it is determined that the cash-withdrawal transaction is not authorized, the cash-withdrawal transaction is declined. If at step 1308, it is determined that the cash-withdrawal transaction is authorized, step 1310 is performed. At step 1310, the terminal device 106 determines the second amount of cash available at the terminal device 106 in the cash trey 1204. At step 1312, the terminal device 106 determines whether the second amount is greater than or equal to the first amount. If at step 1312, it is determined that the second amount is greater than or equal to the first amount, step 1314 is performed. At step 1314, the terminal device 106 dispenses the first amount as cash and the transaction is successful. If at step 1312, it is determined that the second amount is less than the first amount, step 1316 is performed. At step 1316, the terminal device 106 notifies the user 102 regarding insufficient cash and presents the first option for enabling the user 102 to receive the first part of the first amount as one of a voucher or credit in a digital wallet. At step 1318, the terminal device 106 determines whether the first option is selected by the user 102. If at step 1318, it is determined that the first option is not selected, the transaction is declined. If at step 1318, it is determined that the first option is selected, step 1320 is performed.

At step 1320, the terminal device 106 displays the list of digital wallets and vouchers to the user 102 for selection. The user 102 may select one of the digital wallets or the vouchers from the list to receive the first part of the first amount as digital money. At step 1322, the terminal device 106 communicates the first request to the payment network server 110 indicating the selection of the first option and one of the digital wallets or the vouchers. At step 1324, the terminal device 106 dispenses the second part of the first amount as cash. When the second amount is zero, the terminal device 106 does not dispense any cash as the second part of the first amount is also zero. In a scenario where the first voucher is selected by the user 102, the terminal device 106 may print or display the details of the first voucher.

Figure 14A:
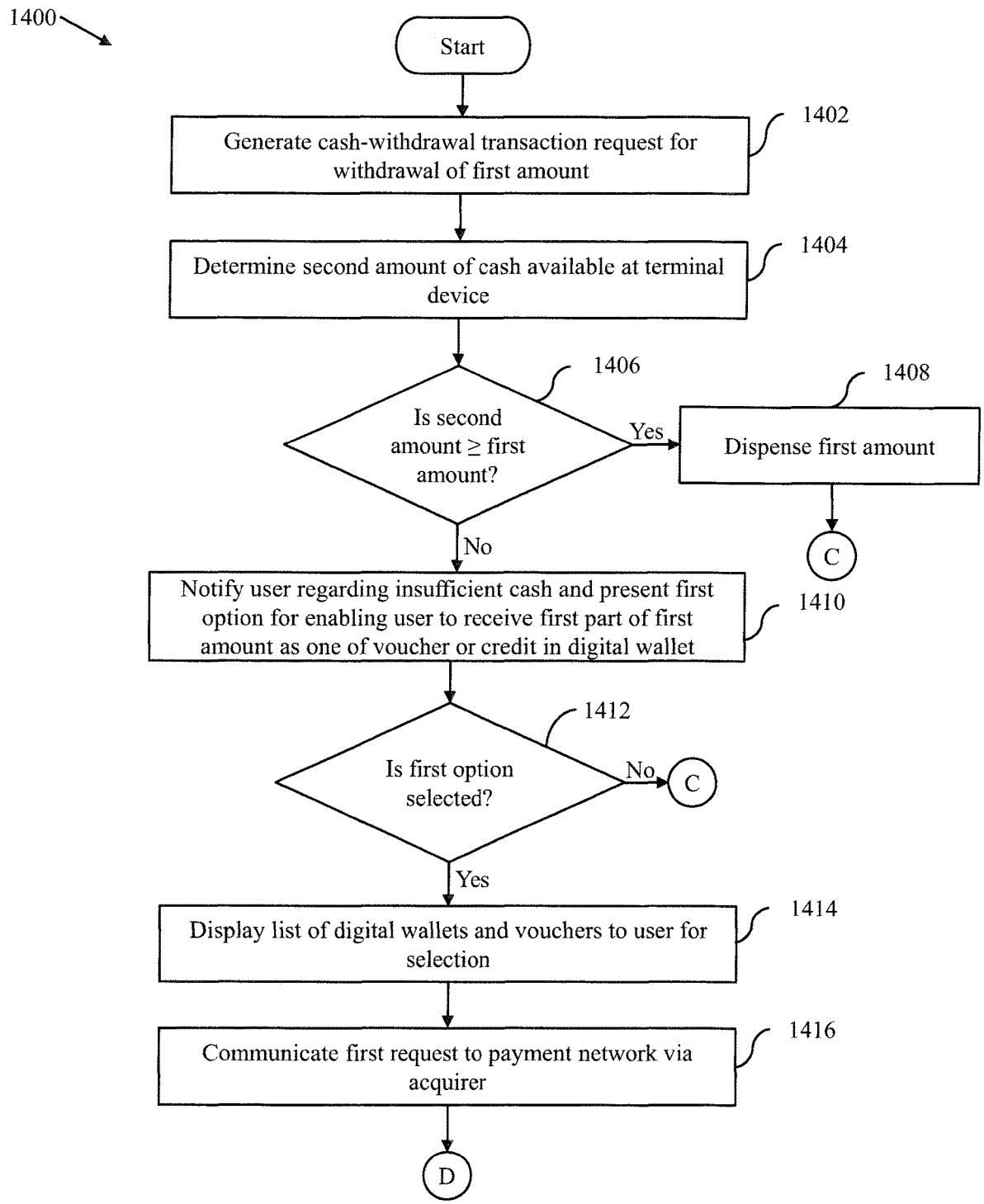
FIGS. 14A and 14B, collectively represent a flow chart that illustrates a method for processing cash-withdrawal transactions, in accordance with another embodiment of the present invention.
Figure 14B:
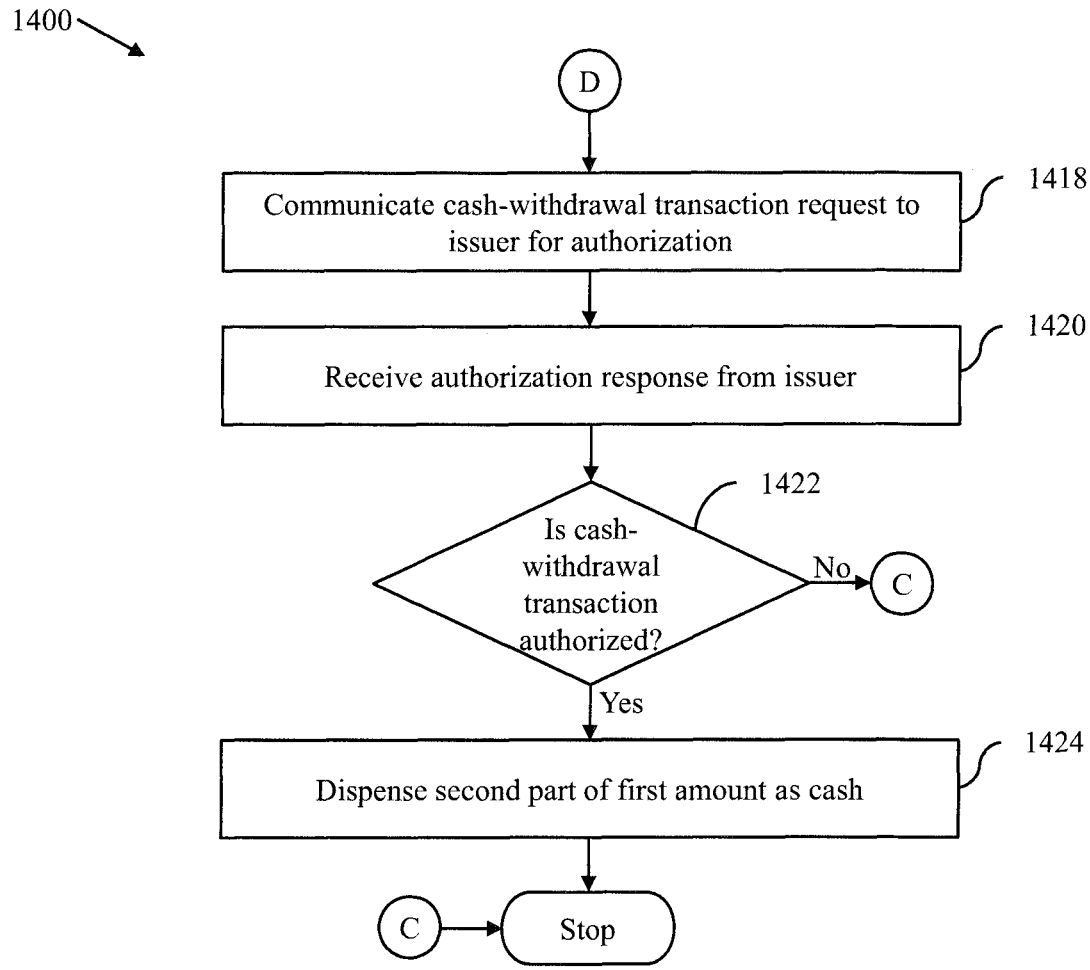

FIGS. 14A and 14B, collectively represent a flow chart 1400 that illustrates a method for processing cash-withdrawal transactions, in accordance with another embodiment of the present invention. The terminal device 106 may be utilized by the user 102 to perform the cash-withdrawal transaction for the first amount. At step 1402, the terminal device 106 generates a cash-withdrawal transaction request for the withdrawal of the first amount. At step 1404, the terminal device 106 determines the second amount of cash available at the terminal device 106 in the cash trey 1204. At step 1406, the terminal device 106 determines whether the second amount is greater than or equal to the first amount. If at step 1406, it is determined that the second amount is greater than or equal to the first amount, step 1408 is performed.

At step 1408, the terminal device 106 dispenses the first amount as cash and the transaction is successful. If at step 1406, it is determined that the second amount is less than the first amount, step 1410 is performed. At step 1410, the terminal device 106 notifies the user 102 regarding insufficient cash and presents the first option for enabling the user 102 to receive the first part of the first amount as one of a voucher or credit in a digital wallet. At step 1412, the terminal device 106 determines whether the first option is selected by the user 102. If at step 1412, it is determined that the first option is not selected, the transaction is declined. If at step 1412, it is determined that the first option is selected, step 1414 is performed. At step 1414, the terminal device 106 displays the list of digital wallets and vouchers to the user 102 for selection. The user 102 may selects one of the digital wallets or the vouchers from the list to receive the first part of the first amount as digital money. At step 1416, the terminal device 106 communicates the first request to the payment network server 110 via the acquirer server 108 indicating the selection of the first option and one of the digital wallets or the vouchers. At step 1418, the terminal device 106 further communicates the cash-withdrawal transaction request to the issuer server 112 for authorization by way of the acquirer server 108 and the payment network server 110. At step 1420, the terminal device 106 receives the authorization response from the issuer server 112 by way of the acquirer server 108 and the payment network server 110.

At step 1422, the terminal device 106 checks whether the cash-withdrawal transaction is authorized. If at step 1422, it is determined that the cash-withdrawal transaction is not authorized, the cash-withdrawal transaction is declined. If at step 1422, it is determined that the cash-withdrawal transaction request is authorized, step 1424 is performed. At step 1424, the terminal device 106 dispenses the second part of the first amount as cash. When the second amount is zero, the terminal device 106 does not dispense any cash as the second part of the first amount is also zero. In a scenario where the first voucher is selected by the user 102, the terminal device 106 may print or display the details of the first voucher.

Figure 15A:
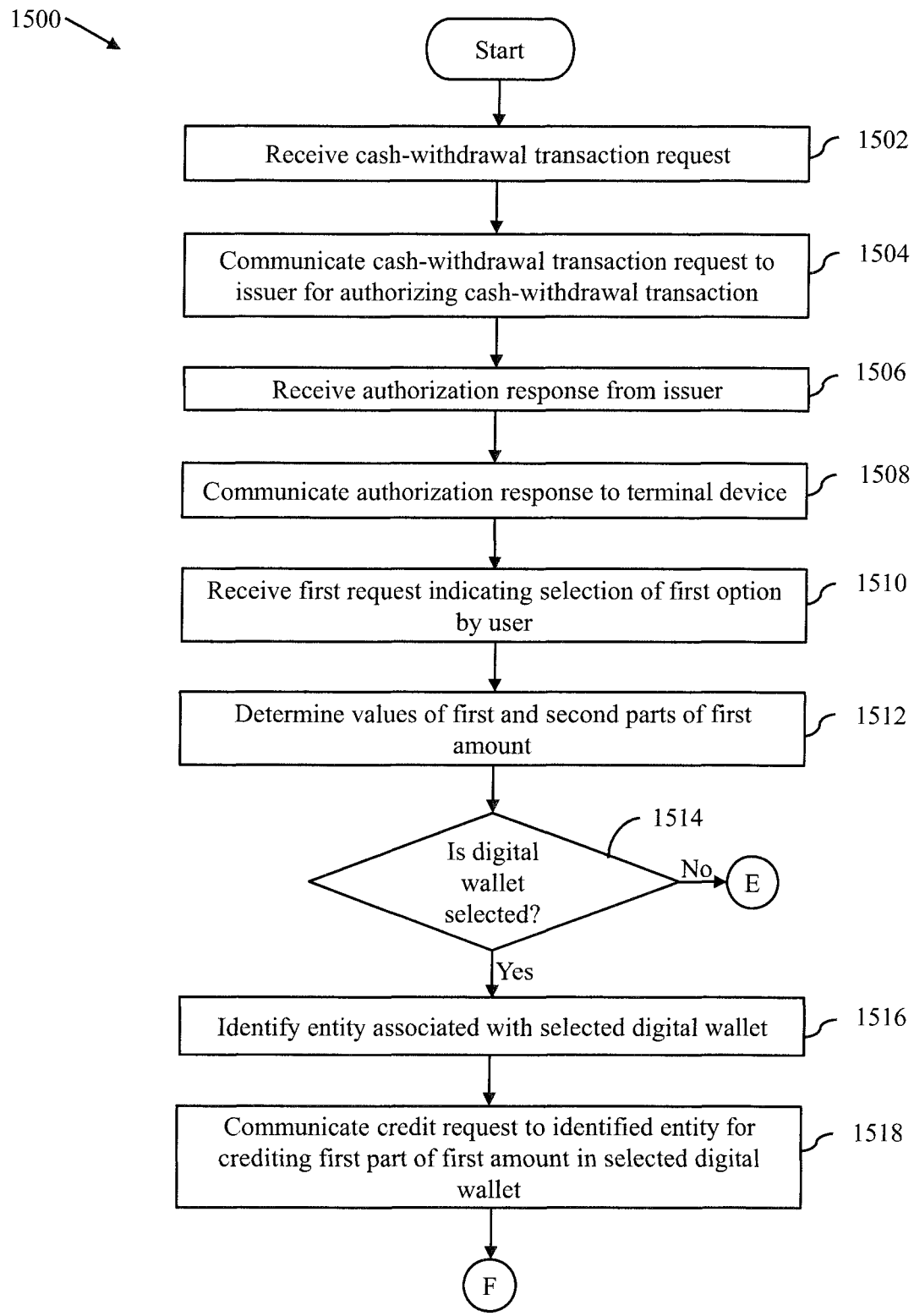
FIGS. 15A-15C, collectively represent a flow chart that illustrates a method for processing cash-withdrawal transactions, in accordance with an embodiment of the present invention.
Figure 15B:
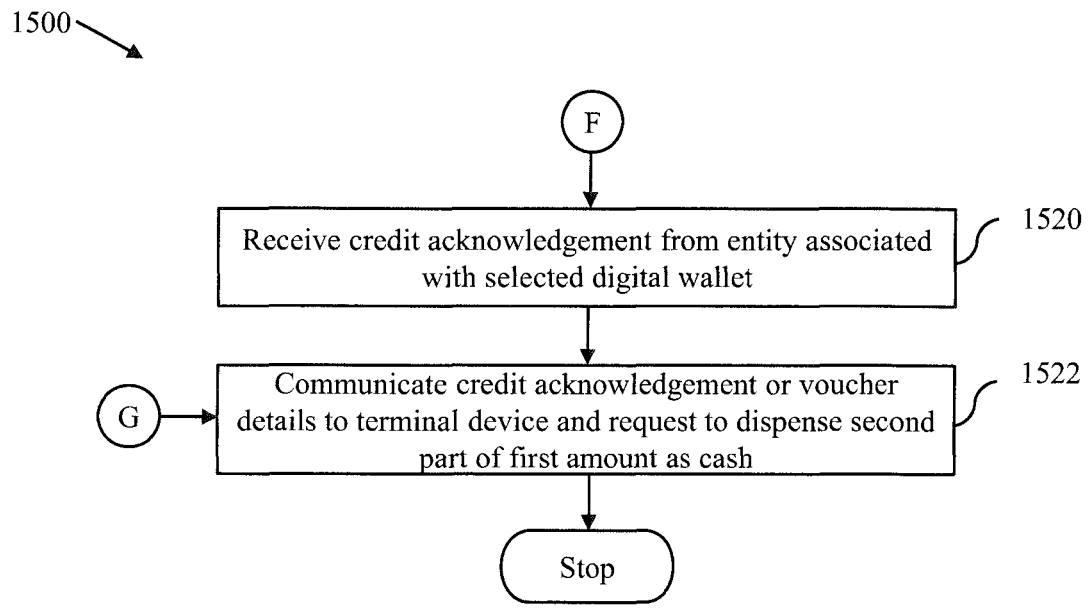
Figure 15C:
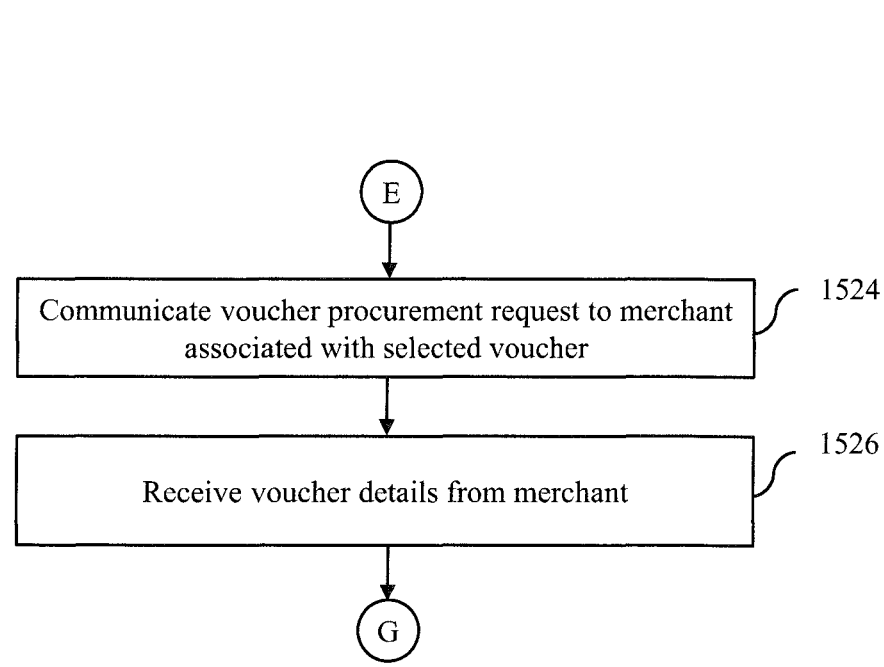

FIGS. 15A-15C, collectively represent a flow chart 1500 that illustrates a method for processing cash-withdrawal transactions, in accordance with an embodiment of the present invention. At step 1502, the payment network server 110 receives the cash-withdrawal transaction request from the terminal device 106 by way of the acquirer server 108. At step 1504, the payment network server 110 communicates the cash-withdrawal transaction request to the issuer server 112 for authorizing the cash-withdrawal transaction. At step 1506, the payment network server 110 receives the authorization response from the issuer server 112. At step 1508, the payment network server 110 communicates the authorization response to the terminal device 106 by way of the acquirer server 108. At step 1510, the payment network server 110 receives the first request indicating the selection of the first option by the user 102. The payment network server 110 further receives information of one of the voucher or digital wallet selected by the user 102 from the list of digital wallets and vouchers displayed by the terminal device 106. At step 1512, the payment network server 110 determines the values of the first and second parts of the first amount based on the first request. At step 1514, the payment network server 110 determines whether a digital wallet is selected from the list of digital wallets and vouchers. If at step 1514, it is determined that a digital wallet is selected from the list of digital wallets and vouchers, step 1516 is performed. At step 1516, the payment network server 110 identifies an entity associated with the selected digital wallet. The entity maintaining the digital wallet may be the acquirer server 108, the payment network server 110, the issuer server 112, or the third-party server 116. At step 1518, the payment network server 110 communicates the credit request to the entity maintaining the selected digital wallet for crediting the first part of the first amount in the selected digital wallet. For example, when the selected digital wallet is maintained at the issuer server 112, the credit request is communicated to the issuer server 112 (as described in FIG. 2). In another example, when the selected digital wallet is maintained at the acquirer server 108, the credit request is communicated to the acquirer server 108 (as described in FIG. 3). In yet another example, when the selected digital wallet is maintained at the third-party server 116, the credit request is communicated to the third-party server 116 (as described in FIG. 4). At step 1520, the payment network server 110 receives the credit acknowledgement for the entity associated with the selected digital wallet. At step 1522, the payment network server 110 communicates the credit acknowledgement or voucher details to the terminal device 106 by way of the acquirer server 108 and requests (e.g., the cash-dispense request) the terminal device 106 to dispense the second part of the first amount as cash.

If at step 1514, it is determined that the user 102 has selected a voucher from the list of digital wallets and vouchers, step 1524 is performed. At step 1524, the payment network server 110 communicates the voucher procurement request to the merchant server 114 associated with the selected voucher. At step 1526, the payment network server 110 receives the voucher details of the voucher from the merchant server 114 and performs step 1522.

Figure 16:
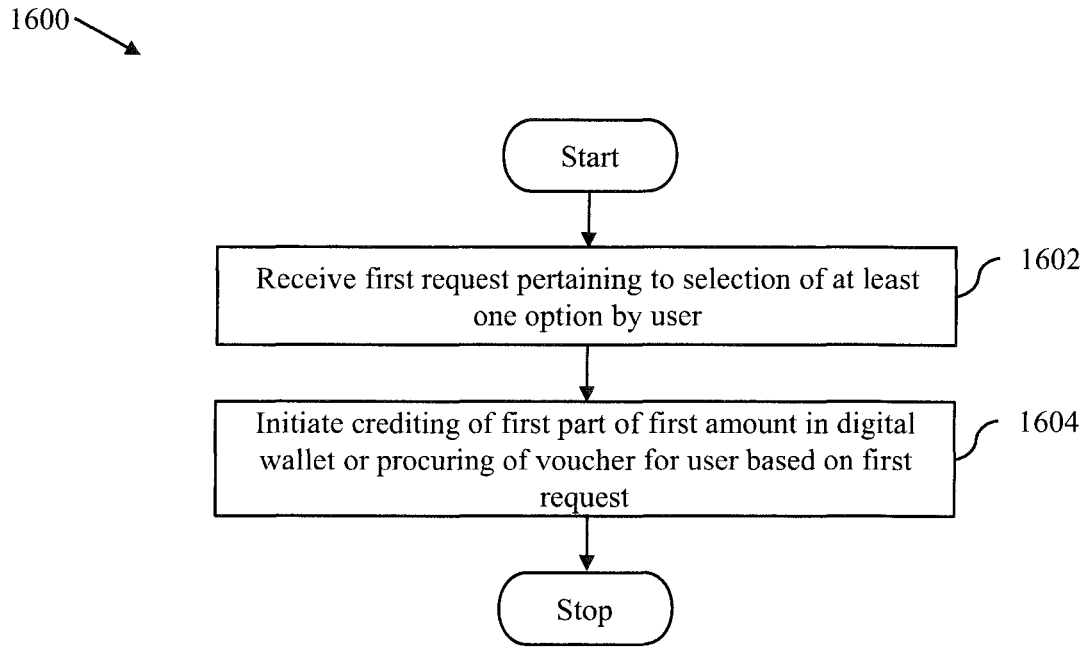
FIG. 16 represents a high-level flow chart that illustrates a method for processing cash-withdrawal transactions, in accordance with an embodiment of the present invention.

FIG. 16 represents a high-level flow chart 1600 that illustrates a method for processing cash-withdrawal transactions, in accordance with an embodiment of the present invention. At step 1602, the payment network server 110 receives the first request indicating the selection of at least one option (i.e., the first option) by the user 102 (as described in FIGS. 2-5). The at least one option is presented on the terminal device 106 when the cash-withdrawal transaction is requested by the user 102 at the terminal device 106 for withdrawing the first amount of cash and when the second amount of cash available at the terminal device 106 is less than the first amount. The selection of the at least one option indicates that the user 102 consents to receive at least the first part of the first amount as one of a voucher or a credit in a digital wallet. At step 1604, the payment network server 110 initiates crediting of the first part of the first amount in the digital wallet or procuring of the voucher for the user 102 based on the first request.

Figure 17:
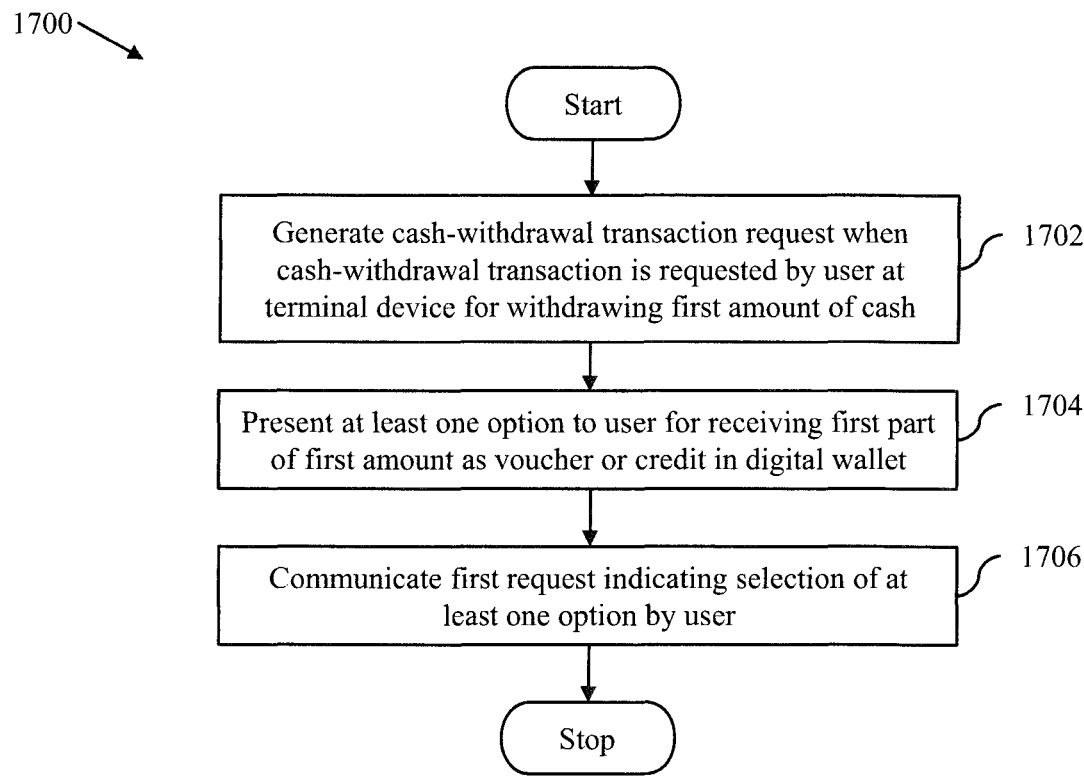
FIG. 17 represents a high-level flow chart that illustrates a method for processing cash-withdrawal transactions, in accordance with an embodiment of the present invention.

FIG. 17 represents a high-level flow chart 1700 that illustrates a method for processing cash-withdrawal transaction, in accordance with an embodiment of the present invention. At step 1702, the terminal device 106 generates the cash-withdrawal transaction request when the cash-withdrawal transaction is requested by the user 102 at the terminal device 106 for withdrawing the first amount of cash (as described in FIGS. 2-5). At step 1704, the terminal device 106 presents at least one option (i.e., the first option) to the user 102 for receiving the first part of the first amount as a first voucher or credit in a first digital wallet. At step 1706, the terminal device 106 communicates to the payment network server 110 the first request indicating the selection of the at least one option by the user 102. Based on the first request, the payment network server 110 initiates procuring of the first voucher for the user 102 or crediting of the first part of the first amount in the first digital wallet.

Figure 18:
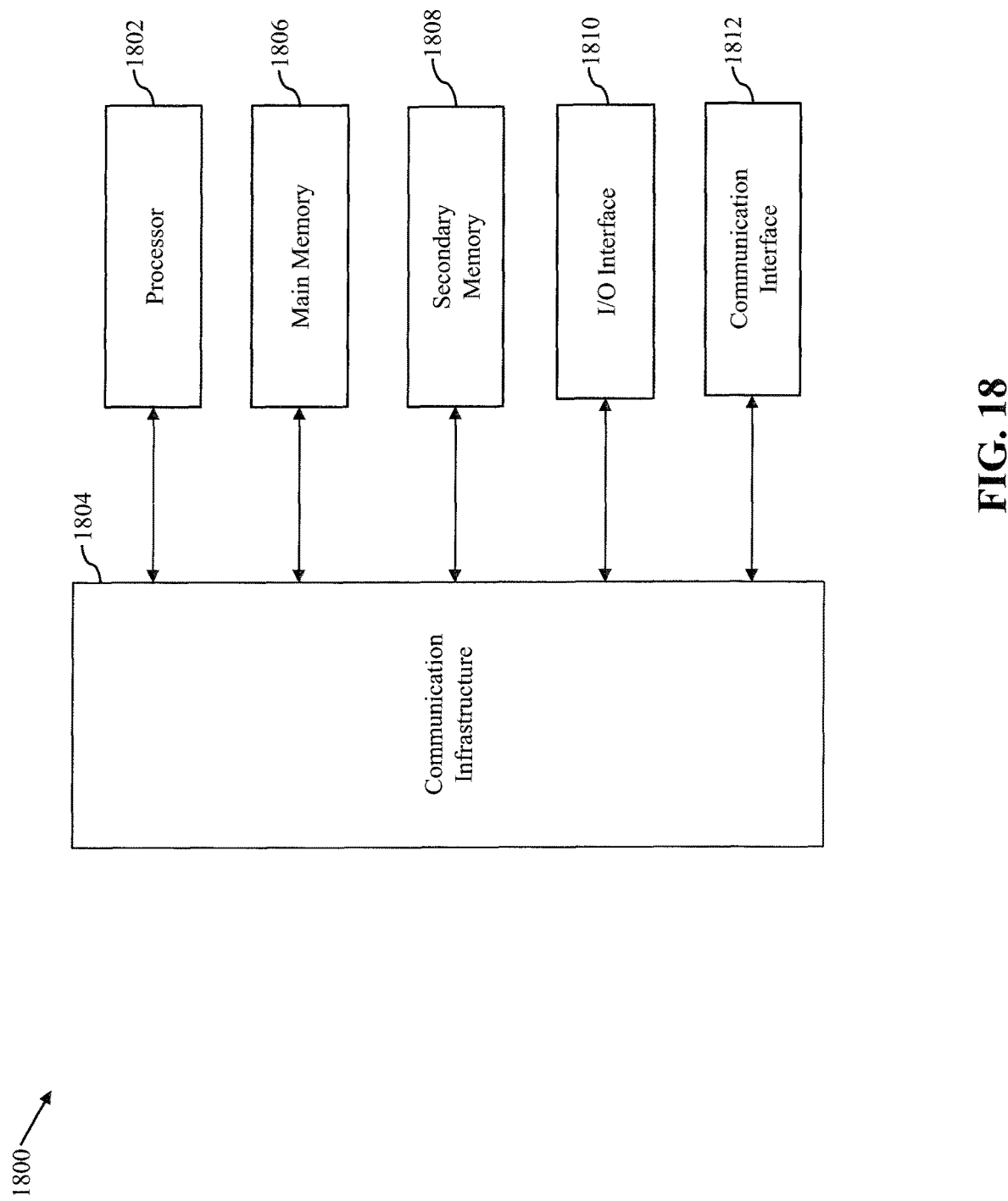
FIG. 18 is a block diagram that illustrates system architecture of a computer system, in accordance with an embodiment of the present invention.

FIG. 18 is a block diagram that illustrates system architecture of a computer system 1800, in accordance with an embodiment of the present invention. An embodiment of present invention, or portions thereof, may be implemented as computer readable code on the computer system 1800. In one example, the acquirer server 108, the payment network server 110, the issuer server 112, the merchant server 114, and the third-party server 116 may be implemented in the computer system 1800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 13A and 13B, 14A and 14B, 15A-15C, 16, and 17.

The computer system 1800 includes a processor 1802 that may be a special-purpose or a general-purpose processing device. The processor 1802 may be a single processor, multiple processors, or combinations thereof. The processor 1802 may have one or more processor cores. In one example, the processor 1802 is an octa-core processor. Further, the processor 1802 may be connected to a communication infrastructure 1804, such as a bus, message queue, multi-core message-passing scheme, and the like. The computer system 1800 may further include a main memory 1806 and a secondary memory 1808. Examples of the main memory 1806 may include RAM, ROM, and the like. The secondary memory 1808 may include a hard disk drive or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 1800 further includes an input/output (I/O) interface 1810 and a communication interface 1812. The I/O interface 1810 includes various input and output devices that are configured to communicate with the processor 1802. Examples of the input devices may include a keyboard, a mouse, a joystick, a touchscreen, a microphone, and the like. Examples, of the output devices may include a display screen, a speaker, headphones, and the like. The communication interface 1812 may be configured to allow data to be transferred between the computer system 1800 and various devices that are communicatively coupled to the computer system 1800. Examples of the communication interface 1812 may include a modem, a network interface, i.e., an Ethernet card, a communications port, and the like. Data transferred via the communication interface 1812 may correspond to signals, such as electronic, electromagnetic, optical, or other signals as will be apparent to a person skilled in the art. The signals may travel via a communications channel (not shown) which may be configured to transmit the signals to devices that are communicatively coupled to the computer system 1800. Examples of the communications channel may include, but are not limited to, cable, fiber optics, a phone line, a cellular phone link, a radio frequency link, and the like.

Computer program medium and computer usable medium may refer to memories, such as the main memory 1806 and the secondary memory 1808, which may be a semiconductor memory such as a DRAM. These computer program mediums may provide data that enables the computer system 1800 to implement the methods illustrated in FIGS. 13A and 13B, 14A and 14B, 15A-15C, 16, and 17. In an embodiment, the present invention is implemented using a computer implemented application, the computer implemented application may be stored in a computer program product and loaded into the computer system 1800 using the removable storage drive or the hard disc drive in the secondary memory 1808, the I/O interface 1810, or communication interface 1812.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 1802 and a memory such as the main memory 1806 and the secondary memory 1808 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Thus, the environment 100 enables users (e.g., the user 102) to receive at least an amount of cash available at the terminal device 106 when the transaction amount (i.e., the first amount) is greater than the amount of cash (i.e., the second amount) available at the terminal device 106. The user 102 is provided with an option (i.e., the first option) to receive the first part of the first amount that the terminal device 106 is falling short of as one of a voucher or credit in a digital wallet. For example, if the user 102 is withdrawing cash to go for shopping to a first store, the user 102 may opt to select a voucher offered by the first store. In another example, the first store may support payment by means of a digital wallet, thus, the user 102 may opt to select the digital wallet to receive the first part of the first amount that the terminal device 106 is falling short of as credit. Hence, the method and system of the present invention results in reduction in a number of declined transactions due to insufficient cash at the terminal device 106, thereby increasing overall profitability of acquirers, payment networks, issuers, and merchants who offer such vouchers.

Techniques consistent with the present invention provide, among other features, systems and methods for processing cash-withdrawal transactions. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A computer-implemented method for processing cash-withdrawal transactions, the method comprising:
    receiving, by a terminal device, a cash-withdrawal transaction requested by a user for withdrawing a first amount of cash from the terminal device;
    determining, by the terminal device, whether sufficient cash is available to the terminal device to cover the first amount of cash;
    in response to determining that sufficient cash revenue is not available to the terminal device to cover the first amount of cash, presenting, by the terminal device, at least one option to the user to receive a first part of the first amount as one of a first voucher or a credit in a first digital wallet and a second part of the first amount dispensed as cash at the terminal device;
    receiving, by the terminal device, a first request indicating a selection of the at least one option by the user, wherein the selection of the at least one option indicates that consent is provided by the user to receive the first part of the first amount as one of a first voucher or a credit in a first digital wallet and the second part of the first amount as cash dispensed from the terminal device; and
    initiating, by the terminal device, procuring of the first voucher for the user or crediting of the first part of the first amount in the first digital wallet, based on the first request.

2. The method of claim 1, further comprising:
    receiving, by a server from the terminal device, a cash-withdrawal transaction request for the cash-withdrawal transaction requested by the user at the terminal device; and
    initiating, by the server, an authorization of the cash-withdrawal transaction prior to initiating procuring of the first voucher or crediting of the first part.

3. The method of claim 2, further comprising communicating, by the server, an authorization response to the terminal device based on the authorization of the cash-withdrawal transaction.

4. The method of claim 1,
    wherein the second part of the first amount is a difference between the first amount and the first part of the first amount.

5. The method of claim 1, further comprising communicating, by the terminal device to the user, voucher details of the first voucher that is procured for the user.

6. The method of claim 1, further comprising presenting, by the terminal device to the user, a set of digital wallets including the first digital wallet when the user selects the at least one option, wherein each digital wallet in the set of digital wallets is selectable by the user.

7. The method of claim 1, further comprising presenting, by the terminal device to the user, a set of vouchers including the first voucher when the user selects the at least one option, wherein each voucher in the set of vouchers is selectable by the user.

8. The method of claim 1, further comprising dispensing, by the terminal device, the second part of the first amount as cash.

9. The method of claim 1, wherein the initiating, by the terminal device server, procuring of the first voucher for the user or crediting of the first part of the first amount in the first digital wallet, based on the first request, includes communicating, by the terminal device to an issuer, the cash-withdrawal transaction request for authorizing the cash-withdrawal transaction, wherein the server initiates procuring of the first voucher for the user or crediting of the first part of the first amount in the first digital wallet.

10. A system for processing cash-withdrawal transactions, the system comprising:
  a payment network server that is configured to:
  receive, from a terminal device, a first request indicating a selection of at least one option by a user,
    wherein the at least one option is presented on the terminal device when a cash-withdrawal transaction is requested by the user at the terminal device for withdrawing a first amount of cash and when a second amount of cash available at the terminal device is less than the first amount, and
    wherein the selection of the at least one option indicates that consent is provided by the user to receive a first part of the first amount as one of a first voucher or a credit in a first digital wallet and a second part of the first amount dispensed as cash at the terminal device, and
  initiate procuring of the first voucher for the user or crediting of the first part of the first amount in the first digital wallet, based on the first request.

11. The system of claim 10, wherein the payment network server is further configured to:
  receive a cash-withdrawal transaction request for the cash-withdrawal transaction requested by the user at the terminal device, and
  initiate an authorization of the cash-withdrawal transaction prior to initiating procuring of the first voucher or crediting of the first part of the first amount.

12. The system of claim 11, wherein the payment network server is further configured to communicate an authorization response to the terminal device based on the authorization of the cash-withdrawal transaction.

13. The system of claim 10, wherein the payment network server is further configured to determine based on the first request a first value of the first part for initiating procuring of the first voucher or crediting of the first part.

14. The system of claim 13, wherein
  the second part of the first amount is a difference between the first amount and the first part of the first amount.

15. The system of claim 10, wherein the payment network server is further configured to communicate, to the user, voucher details of the first voucher that is procured for the user.

* * * * *